US011656813B2

(12) United States Patent
Yoshigi

(10) Patent No.: US 11,656,813 B2
(45) Date of Patent: May 23, 2023

(54) PRINTING SYSTEM, DETECTION METHOD, AND RECORDING MEDIUM HAVING COMPUTER PROGRAM STORED THEREIN FOR DETECTING A PORTION BETWEEN AN ADJACENT PAIR OF LABELS

(71) Applicant: Seiko Instruments Inc., Chiba (JP)

(72) Inventor: Yuichi Yoshigi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 17/571,212

(22) Filed: Jan. 7, 2022

(65) Prior Publication Data

US 2022/0222018 A1    Jul. 14, 2022

(30) Foreign Application Priority Data

Jan. 13, 2021   (JP) .............................. JP2021-003590

(51) Int. Cl.
*G06F 3/12* (2006.01)
(52) U.S. Cl.
CPC ............ *G06F 3/121* (2013.01); *G06F 3/1259* (2013.01); *G06F 3/1282* (2013.01)
(58) Field of Classification Search
None
See application file for complete search history.

(56) References Cited

U.S. PATENT DOCUMENTS

| | | | |
|---|---|---|---|
| 6,492,821 B1 | 12/2002 | Marko et al. | |
| 8,714,688 B2* | 5/2014 | Saikawa | B41J 11/42 347/19 |
| 8,724,131 B2* | 5/2014 | Young | B41J 29/393 358/1.14 |
| 9,016,828 B2* | 4/2015 | Yatsunami | B41J 11/0095 347/19 |
| 10,759,198 B2* | 9/2020 | Snyder | B41J 13/26 |
| 11,459,199 B2* | 10/2022 | Koyama | B41J 3/4075 |
| 2005/0025554 A1* | 2/2005 | Inaba | B41J 3/4075 400/611 |

(Continued)

FOREIGN PATENT DOCUMENTS

| | | |
|---|---|---|
| JP | 2002-308242 A | 10/2002 |
| JP | 2017-081673 A | 5/2017 |
| JP | 2017-132087 A | 8/2017 |

OTHER PUBLICATIONS

Extended European Search Report in Europe Application No. 22151142.1, dated Jun. 2, 2022.

*Primary Examiner* — Henok Shiferaw
(74) *Attorney, Agent, or Firm* — Crowell & Moring LLP

(57) ABSTRACT

A printing system includes: a conveyance controller configured to control a conveyor, the conveyor being configured to convey paper having a printing surface in which label portions are formed at predetermined intervals; a sensor configured to irradiate light on the paper conveyed by the conveyor to detect reflected light of the irradiated light; a detector configured to detect an output of the sensor; a moving average calculator configured to calculate moving averages of voltage values based on the output of the sensor detected by the detector; and a determiner configured to determine that a portion between an adjacent pair of the label portions has been detected based on the moving averages of the voltage values calculated by the moving average calculator, and the output of the sensor.

8 Claims, 16 Drawing Sheets

(56) References Cited

U.S. PATENT DOCUMENTS

| | | | | |
|---|---|---|---|---|
| 2016/0349685 A1* | 12/2016 | Kato | .................... | G03G 15/652 |
| 2017/0210157 A1* | 7/2017 | Obara | .................... | B41J 11/008 |
| 2020/0101772 A1* | 4/2020 | Wakakusa | ............ | B41J 13/0009 |
| 2020/0207565 A1* | 7/2020 | Koyama | .................. | B41J 11/42 |

\* cited by examiner

PRINTING SYSTEM, DETECTION METHOD, AND RECORDING MEDIUM HAVING COMPUTER PROGRAM STORED THEREIN FOR DETECTING A PORTION BETWEEN AN ADJACENT PAIR OF LABELS

RELATED APPLICATIONS

This application claims priority to Japanese Patent Application No. 2021-003590, filed on Jan. 13, 2021, the entire content of which is incorporated herein by reference.

BACKGROUND OF THE INVENTION

1. Field of the Invention

The present invention relates to a printing system, a detection method, and a recording medium having a computer program stored therein.

2. Description of the Related Art

In regard to printing systems, such as a thermal printer, there has been known a technology of detecting a detection area provided on a paper surface. In this technology, a conveyor conveys paper on which a mark for determining a printing position is provided in at least a portion of a paper surface of the paper, an acquisition device acquires detection signals from a sensor which optically detects the mark on the paper surface conveyed by the conveyor, at predetermined intervals in accordance with the conveyance of the paper, and a detector detects the mark based on an integrated value of amounts of change in the detection signals acquired at the predetermined intervals.

In the technology described above, the mark is detected with use of a difference between a reflectance of the portion of the mark provided on the paper surface and a reflectance of a portion in which the mark is not provided. For that reason, if label paper on which the mark is not provided and in which label portions are formed is used, a portion between the label portions is detected based on a difference between a reflectance of the label portions and a reflectance of the portion between the label portions. The portion between the label portions may be hereinafter sometimes referred to as "gap portion." The difference between the reflectance of the label portions and the reflectance of the gap portion is very small. An amount of change in reflectance caused by fluttering of the label paper may be larger than the difference. Accordingly, there is a fear in that the fluttering of the label paper may be erroneously detected as the gap portion.

Thus, in this technical field, there have been sought for a printing system, a detection method, and a recording medium having a computer program stored therein with which erroneous detections of a portion between label portions of paper having the label portions formed therein can be reduced.

SUMMARY OF THE INVENTION

According to one embodiment of the present invention, there is provided a printing system including: a conveyance controller configured to control a conveyor, the conveyor being configured to convey paper having a printing surface in which label portions are formed at predetermined intervals; a sensor configured to irradiate light on the paper conveyed by the conveyor to detect reflected light of the irradiated light; a detector configured to detect an output of the sensor; a moving average calculator configured to calculate moving averages of voltage values based on the output of the sensor detected by the detector; and a determiner configured to determine that a portion between an adjacent pair of the label portions has been detected based on the moving averages of the voltage values calculated by the moving average calculator, and the output of the sensor.

In the above-mentioned printing system according to the one embodiment of the present invention, wherein the moving average calculator is configured to calculate a moving average for dot lines set based on a length of the portion between the adjacent pair of the label portions.

In the above-mentioned printing system according to the one embodiment of the present invention, wherein the moving average calculator is configured to acquire a moving average corresponding to the portion between the adjacent pair of the label portions based on the moving averages, and calculate a threshold value for determining to be a portion between the adjacent pair of the label portions based on the acquired moving average corresponding to the portion between the adjacent pair of the label portions and the moving averages, and wherein the determiner is configured to determine that the portion between the adjacent pair of the label portions has been detected when the threshold value calculated by the moving average calculator is the output of the sensor or more.

In the above-mentioned printing system according to the one embodiment of the present invention, wherein the determiner is configured to determine that fluttering of a label portion has been detected when the threshold value calculated by the moving average calculator is less than the output of the sensor, and when a difference between the output of the sensor and the threshold value is less than a voltage threshold value for determining to be a gap portion, or the number of dot lines for which the output of the sensor exceeds the threshold value is less than a number-of-dot-lines threshold value for determining to be a gap portion.

In the above-mentioned printing system according to the one embodiment of the present invention, wherein the determiner is configured to determine that the portion between the adjacent pair of the label portions has been detected when the threshold value calculated by the moving average calculator is less than the output of the sensor, when the output of the sensor is higher than the threshold value by the voltage threshold value for determining to be a gap portion or more, and the number of dot lines for which the output of the sensor exceeds the threshold value is the number-of-dot-lines threshold value for determining to be a gap portion or more, and when the output of the sensor is a maximum value of moving averages of previous gap portions or less after the paper is fed by a number-of-dot-lines threshold value for determining to be out of paper.

In the above-mentioned printing system according to the one embodiment of the present invention, wherein the determiner is configured to determine that running out of paper has been detected when the threshold value calculated by the moving average calculator is less than the output of the sensor, when the output of the sensor is higher than the threshold value by the voltage threshold value for determining to be a gap portion or more, and the number of dot lines for which the output of the sensor exceeds the threshold value is the number-of-dot-lines threshold value for determining to be a gap portion or more, and when the output of the sensor is higher than the maximum value of the moving averages of the previous gap portions after the paper is fed by the number-of-dot-lines threshold value for determining to be out of paper.

In the above-mentioned printing system according to the one embodiment of the present invention, wherein the determiner is configured to update the moving average corresponding to the portion between the adjacent pair of the label portions based on the output of the sensor when the output of the sensor is higher than the threshold value calculated by the moving average calculator, or the output of the sensor is higher than the moving average corresponding to the portion between the adjacent pair of the label portions.

According to one embodiment of the present invention, there is provided a detection method to be executed by a printing system, including: controlling a conveyor configured to convey paper having a printing surface in which label portions are formed at predetermined intervals; irradiating, by a sensor, light on the paper conveyed by the conveyor to detect reflected light of the irradiated light; detecting an output of the sensor; calculating moving averages of voltage values based on the output of the sensor detected in the detecting; and determining that a portion between an adjacent pair of the label portions has been detected based on the moving averages of the voltage values calculated in the calculating of the moving averages of the voltage values.

According to one embodiment of the present invention, there is provided a recording medium having stored a computer program, the computer program for causing a computer of a printing system to execute: controlling a conveyor configured to convey paper having a printing surface in which label portions are formed at predetermined intervals; irradiating, by a sensor, light on the paper conveyed by the conveyor to detect reflected light of the irradiated light; detecting an output of the sensor; calculating moving averages of voltage values based on the output of the sensor detected in the detecting; and determining that a portion between an adjacent pair of the label portions has been detected based on the moving averages of the voltage values calculated in the calculating of the moving averages of the voltage values.

DETAILED DESCRIPTION OF THE PREFERRED EMBODIMENTS

Now, a printing system, a detection method, and a recording medium having a computer program stored therein according to at least one embodiment of the present invention are described with reference to the drawings. The at least one embodiment described below is merely an example, and embodiments to which the present invention is applicable are not limited to the following at least one embodiment. Further, an expression "based on XX" in the present application means "based on at least XX", and includes cases based on another element in addition to "XX". In addition, the expression "based on XX" is not limited to cases in which "XX" is directly used, and also includes cases based on "XX" on which calculation or processing has been performed. "XX" may be any element (for example, any information).

Figure 1:
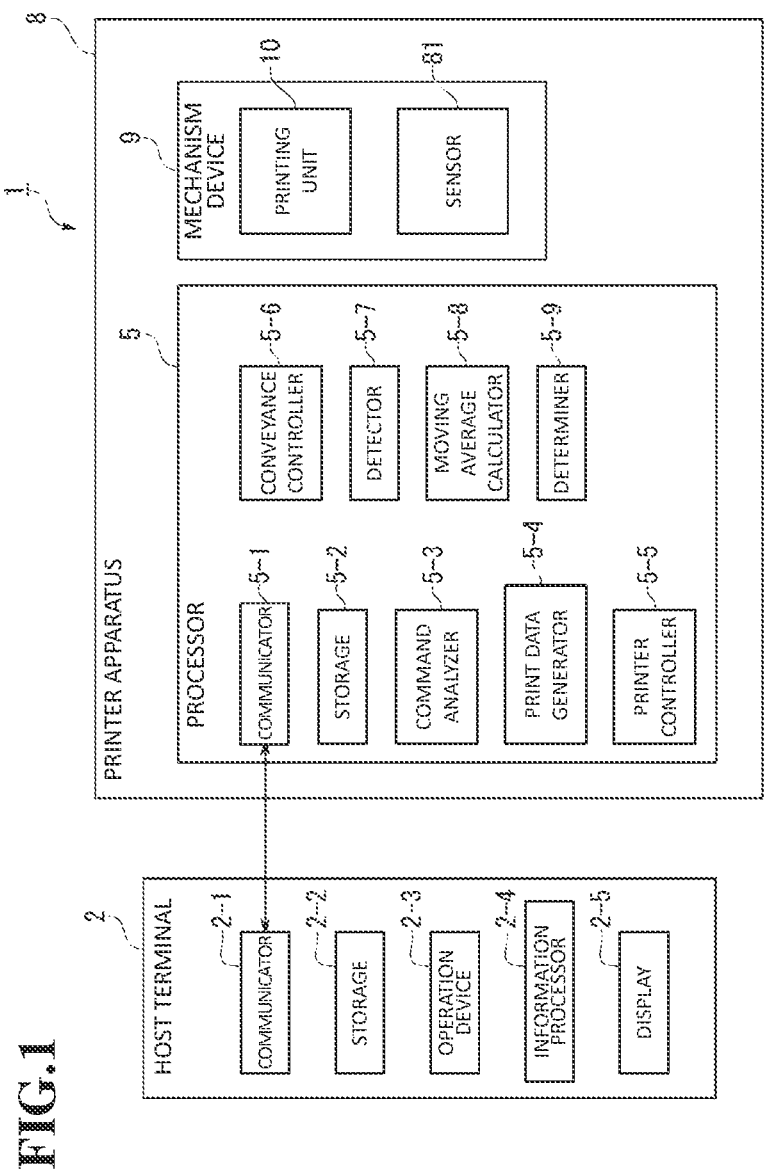
FIG. 1 is a block diagram for illustrating an example of a configuration of a printing system according to at least one embodiment of the present invention.

FIG. 1 is a block diagram for illustrating an example of a configuration of a printing system according to at least one embodiment. As illustrated in FIG. 1, a printing system 1 includes a host terminal 2 which transmits a command to a printer apparatus 8, and the printer apparatus 8 which receives the command transmitted by the host terminal 2 and print data to perform processing based on the received command and print data. The printing system 1 conveys recording paper. The recording paper has a printing surface in which peelable label portions are formed at predetermined intervals. The printing system 1 includes a sensor, and the sensor irradiates light on the conveyed recording paper, and detects reflected light of the irradiated light, to output a detection result of the reflected light of the light. The printing system 1 detects the output of the sensor, and calculates moving averages of voltage values based on the detected output of the sensor. The printing system 1 determines that a portion between adjacent label portions has been detected based on results of calculating the moving averages of the voltage values, and the output of the sensor.

The host terminal 2 and the printer apparatus 8 forming the printing system 1 are described below in the stated order.

The host terminal 2 includes a communicator 2-1, a storage 2-2, an operation device 2-3, an information processor 2-4, and a display 2-5. The communicator 2-1 is implemented by a communication module. Specifically, the communicator 2-1 is built from a wireless device which performs wireless communication by using a wireless communication technology, for example, a wireless LAN (trademark). The communicator 2-1 may also be built from a device which performs wired communication. In this example, description is given of a case in which the communicator 2-1 is built from a wireless device which performs wireless communication by using wireless communication technology. The communicator 2-1 communicates to and from an external apparatus, for example, the printer apparatus 8, via a network. Specifically, the communicator 2-1 receives status information transmitted by the printer apparatus 8 to output the received status information to the information processor 2-4. The status information is information for notifying of the status of the printer apparatus 8. The communicator 2-1 also acquires print data output by the information processor 2-4, and transmits the acquired print data to the printer apparatus 8. The communicator 2-1 also acquires commands output by the information processor 2-4, and transmits the acquired commands to the printer apparatus 8.

The storage 2-2 is implemented by, for example, a random-access memory (RAM), a read-only memory (ROM), a hard disk drive (HDD), a flash memory, or a hybrid storage device in which a plurality of those are combined. The storage 2-2 stores a program to be executed by the information processor 2-4. The operation device 2-3 is a user interface, and includes an input device and an output device. The input device is, for example, key buttons or a touch panel. The key buttons are a start key, a stop key, a numeric keypad, a clear key, a reset key, and the like. The start key is a key button for starting a printing operation. The stop key is a key button for halting the printing operation. The numeric keypad includes key buttons for setting numerical values and the like. In at least one embodiment, the output device is the display 2-5. The display 2-5 functions as a touch panel in addition to displaying images. The display 2-5 displays a setting screen during print processing. From the setting screen, the user can perform settings such as size change and density setting through the touch panel function of the display 2-5 and the operation of key buttons.

The information processor 2-4 acquires the status information output by the communicator 2-1 to acquire information indicating the status of the printer apparatus 8 included in the acquired status information. The information processor 2-4 monitors the status of the printer apparatus 8 based on the acquired information indicating the status of the printer apparatus 8. Specifically, the information processor 2-4 monitors whether the printer apparatus 8 is printing. The information processor 2-4 also generates print data, and outputs the generated print data to the communicator 2-1. The information processor 2-4 further generates a command, and outputs the generated command to the communicator 2-1. All or a part of the information processor 2-4 is a function module (hereinafter referred to as "software function module") implemented by, for example, a processor such as a central processing unit (CPU) executing the program stored in the storage 2-2. All or a part of the information processor 2-4 may also be implemented by hardware such as a large scale integration (LSI) device, an application specific integrated circuit (ASIC), or a field-programmable gate array (FPGA), or may be implemented by a combination of the software function module and the hardware.

The printer apparatus 8 includes a processor 5 and a mechanism device 9. The processor 5 includes a communicator 5-1, a storage 5-2, a command analyzer 5-3, a print data generator 5-4, a printer controller 5-5, a conveyance controller 5-6, a detector 5-7, a moving average calculator 5-8, and a determiner 5-9. The mechanism device 9 includes a printing unit 10 and a sensor 81. The communicator 5-1 is implemented by a communication module. Specifically, the communicator 5-1 is built from a wireless device which performs wireless communication by using a wireless communication technology, for example, a wireless LAN (trademark). The communicator 5-1 may also be built from a device which performs wired communication. In this example, description is given of a case in which the communicator 5-1 is built from a wireless device which performs wireless communication by using a wireless communication technology. The communicator 5-1 communicates to and from an external apparatus, for example, the host terminal 2, via a network. Specifically, the communicator 5-1 receives a command transmitted by the host terminal 2, and the print data. The communicator 5-1 also acquires status information output by the printer controller 5-5, and transmits the acquired status information to the host terminal 2.

The storage 5-2 is implemented by, for example, a RAM, a ROM, an HDD, a flash memory, or a hybrid storage device in which a plurality of those are combined. The storage 5-2 stores, for example, a control program for causing the printer apparatus 8 to execute printing. The command analyzer 5-3 acquires the command received by the communicator 5-1, and analyzes the acquired command. The print data generator 5-4 acquires the print data received by the communicator 5-1, and generates image data for printing based on the acquired print data. The printer controller 5-5 acquires the image data generated by the print data generator 5-4, and generates a control signal for causing a thermal head to print based on the acquired image data. The printer controller 5-5 outputs the generated control signal to the printing unit 10. The printer controller 5-5 also acquires a result of analyzing the command from the command analyzer 5-3, and performs processing based on the acquired result of analyzing the command. Specifically, when the result of analyzing the command is to reset, the printer controller 5-5 resets (restarts) the printer apparatus 8. The printer controller 5-5 further generates the status information, and outputs the generated status information to the communicator 5-1.

The conveyance controller 5-6 acquires the image data generated by the print data generator 5-4, generates a control signal for driving a stepping motor based on the acquired image data, and outputs the generated control signal to the printing unit 10. The detector 5-7 detects a voltage value output by the sensor 81 based on a result of detecting the reflected light of the light. An example of the detector 5-7 detects a voltage value output by the sensor 81 for each dot line. The detector 5-7 acquires a voltage waveform based on results of detecting voltage values output by the sensor 81. An example of the sensor 81 may be a reflection photointerrupter or a transmission photointerrupter. The moving average calculator 5-8 calculates the moving averages of the voltage values based on the voltage waveform acquired by the detector 5-7. An example of the moving average calculator 5-8 calculates moving averages of voltage values for N dot lines. Specifically, the moving average calculator 5-8 calculates moving averages of voltage values based on Equation (1).

$$MAve=(VSen(n)+VSen(n-1)+ \ldots +VSen(n-(N-1)))/N \quad \text{Equation (1)}$$

In Equation (1), MAve is a moving average (V) of sensor outputs (voltage values) for N dot lines, and VSen(n), VSen(n−1), . . . , VSen(n−(N−1)) are the outputs (V) of the sensor from the current dot line to the N-th preceding dot line, and N is a moving average calculation range (dot lines). N may take any value.

The moving average calculator 5-8 acquires information specifying a predetermined value of moving averages of previous gap portions. An example of the predetermined value is, for example, a maximum value, or a value of a portion obtained by reducing the maximum value by a predetermined proportion. In the at least one embodiment, description is given of a case in which the maximum value is applied as an example of the predetermined value. In this case, the moving average calculator 5-8 acquires information specifying the maximum value of the moving averages of the previous gap portions. The moving average calculator 5-8 calculates, based on the acquired information specifying the maximum value of the moving averages of the previous gap portions and the results of calculating the moving averages of the voltage values, a threshold value for determining a gap portion, which is a portion between adjacent label portions. Specifically, the moving average calculator 5-8 calculates the threshold value for determining the gap portion, which is the portion between adjacent label portions, based on Equation (2).

$$Thr=(MAve+MAMax)/2 \quad \text{Equation (2)}$$

In Equation (2), Thr is a threshold value (V) for determining a gap portion, which is a portion between adjacent label portions, and MAMax is a maximum value (V) of moving averages of a previous gap portions. The moving average calculator 5-8 sets a result of calculating an average of a current moving average and the maximum value of the moving averages of the previous gap portions as the threshold value. The determiner 5-9 acquires information specifying the threshold value calculated by the moving average calculator 5-8, information specifying the voltage waveform, information specifying the maximum value of the moving averages of the previous gap portions, and the results of calculating the moving averages. The determiner 5-9 determines, based on the acquired information specifying the threshold value, information specifying the voltage waveform, information specifying the maximum value of the moving averages of the previous gap portions, and results of calculating the moving average, that any one of noise (fluttering of paper), a gap portion, or running out of paper has been detected.

Figure 2:
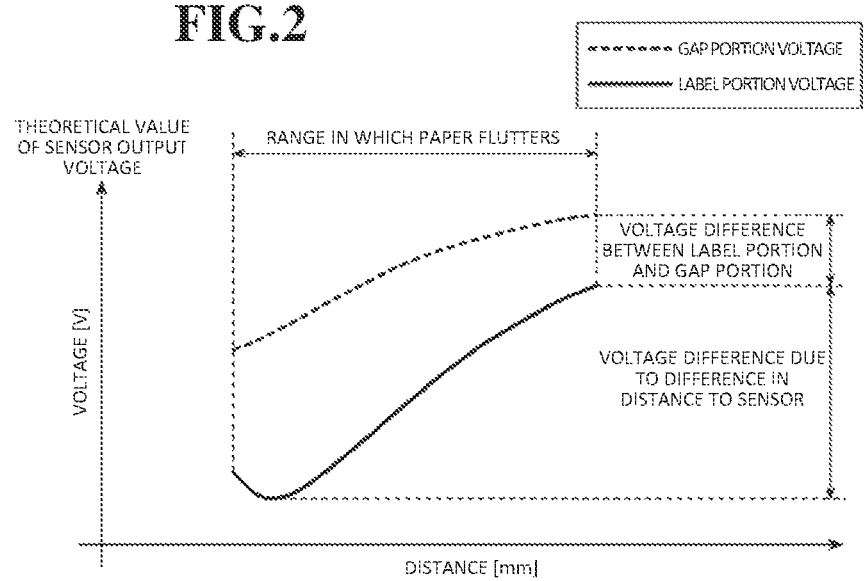
FIG. 2 is a graph for showing Example 1 of a voltage waveform detected by the printing system according to the at least one embodiment.

Referring to FIG. 2 to FIG. 8, description is given of processing of determining that any one of noise (fluttering of paper), a gap portion, or running out of paper has been detected. FIG. 2 is a graph for showing Example 1 of the voltage waveform detected by the printing system according to the at least one embodiment. In FIG. 2, the horizontal axis indicates a distance (mm), and the vertical axis indicates a voltage (V). FIG. 2 shows a relationship between a distance from a predetermined position on paper and a voltage value output by the sensor 81. The solid line indicates a voltage obtained when the sensor 81 irradiates light on a label portion, and the broken line indicates a voltage obtained when the sensor 81 irradiates light on a gap portion. It can be seen from FIG. 2 that the voltage of the gap portion is higher than the voltage of the label portion. Further, as the distance becomes farther away from the predetermined position, the voltage obtained when the sensor 81 irradiates light on a label portion and the voltage obtained when the sensor 81 irradiates light on a gap portion become higher. It is assumed that this is because, as the distance becomes farther away from the predetermined position, fluttering of paper becomes larger. The moving average calculator 5-8 acquires a voltage waveform as indicated by the broken line when the detector 5-7 detects the gap portion by the sensor 81 irradiating light on a gap portion, and acquires a voltage waveform as indicated by the solid line when the detector 5-7 detects the label portion by the sensor 81 irradiating light on a label portion.

Figure 3:
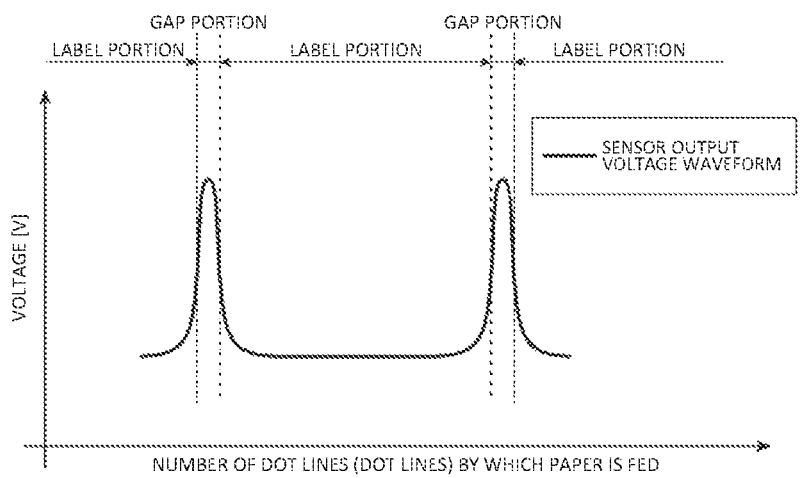
FIG. 3 is a graph for showing Example 2 of the voltage waveform detected by the printing system according to the at least one embodiment.

FIG. 3 is a graph for showing Example 2 of the voltage waveform detected by the printing system according to the at least one embodiment. In FIG. 3, the horizontal axis indicates the number of dot lines (dot lines) by which paper is fed, and the vertical axis indicates a voltage (V). FIG. 3 shows an output waveform of voltage values output by the sensor 81 with respect to the number of dot lines by which paper is fed when the paper is being fed. When the paper is being fed by the conveyance controller 5-6, the moving average calculator 5-8 acquires a voltage waveform that rises when an area in which the sensor 81 irradiates light transitions from a label portion to a gap portion, and falls when the area in which the sensor 81 irradiates light transitions from a gap portion to a label portion.

Figure 4:
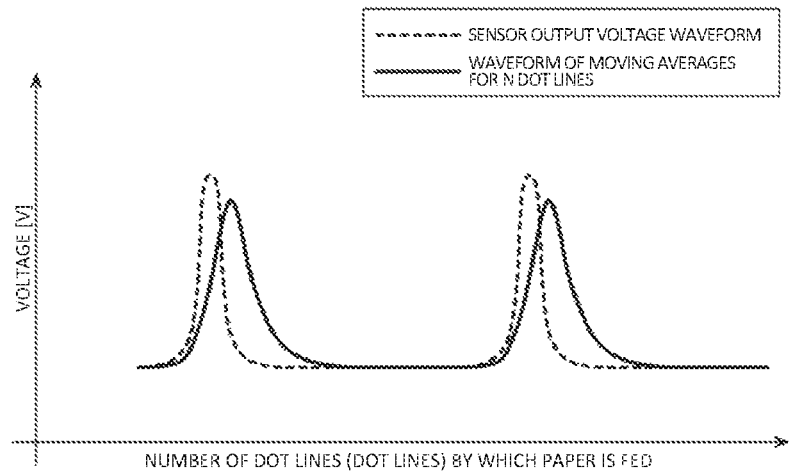
FIG. 4 is a graph for showing Example 3 of the voltage waveform detected by the printing system according to the at least one embodiment.

FIG. 4 is a graph for showing Example 3 of the voltage waveform detected by the printing system according to the at least one embodiment. In FIG. 4, the horizontal axis indicates the number of dot lines (dot lines) by which paper is fed, and the vertical axis indicates a voltage (V). In FIG. 4, the broken line indicates an output waveform of voltage values output by the sensor 81 with respect to the number of dot lines by which paper is fed, and the solid line indicates a waveform of moving averages for N dot lines of voltage values output by the sensor 81 with respect to the number of dot lines by which paper is fed. The moving average calculator 5-8 calculates the moving averages of the voltage values based on the voltage waveform acquired from the detector 5-7.

Figure 5:
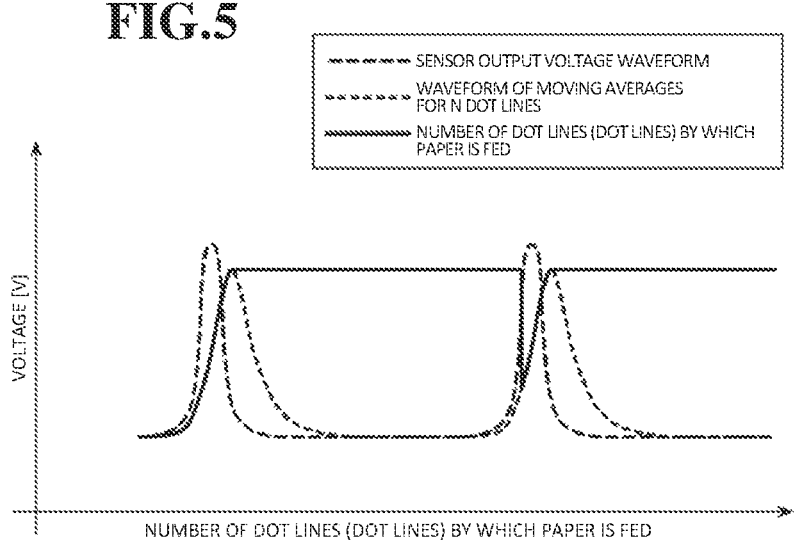
FIG. 5 is a graph for showing Example 4 of the voltage waveform detected by the printing system according to the at least one embodiment.

FIG. 5 is a graph for showing Example 4 of the voltage waveform detected by the printing system according to the at least one embodiment. In FIG. 5, the horizontal axis indicates the number of dot lines (dot lines) by which paper is fed, and the vertical axis indicates a voltage (V). FIG. 5 shows, by the broken lines, the output waveform of the voltage values output by the sensor 81 with respect to the number of dot lines by which paper is fed, which is shown in FIG. 4, and a waveform of moving averages for N dot lines of voltage values output by the sensor 81 with respect to the number of dot lines, and further shows, by the solid line, a maximum value of moving averages of previous gap portions. When the determiner 5-9 has detected a gap portion, the moving average calculator 5-8 acquires the maximum value of the moving averages obtained when determining to be a gap portion based on the calculated moving averages as the information specifying the maximum value of the moving averages of the previous gap portions. There is performed processing of determining, based on the information specifying the maximum value of the moving averages of the previous gap portions, that any one of next noise (fluttering of paper), a gap portion, or running out of paper has been detected.

Figure 6:
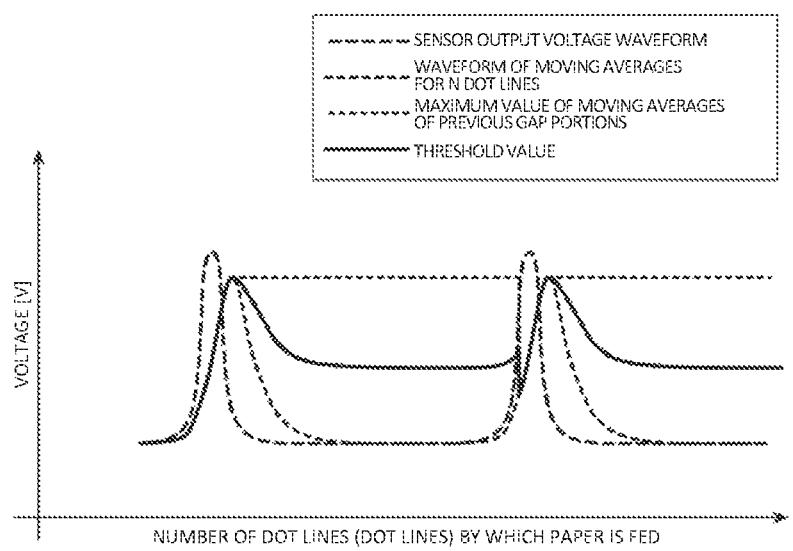
FIG. 6 is a graph for showing Example 5 of the voltage waveform detected by the printing system according to the at least one embodiment.

FIG. 6 is a graph for showing Example 5 of the voltage waveform detected by the printing system according to the at least one embodiment. In FIG. 6, the horizontal axis indicates the number of dot lines (dot lines) by which paper is fed, and the vertical axis indicates a voltage (V). FIG. 6 shows, by the broken lines, the output waveform of the voltage values output by the sensor 81 with respect to the number of dot lines by which paper is fed, the waveform of the moving averages for N dot lines of voltage values output by the sensor 81 with respect to the number of dot lines by which paper is fed, and the maximum value of the moving averages of previous gap portions with respect to the number of dot lines by which paper is fed, which are shown in FIG. 5, and shows the threshold value by the solid line. The moving average calculator 5-8 sets a result of calculating an average of the maximum value of the moving averages of the previous gap portions and the current moving average as the threshold value for determining a gap portion, which is a portion between adjacent label portions.

Figure 7A:
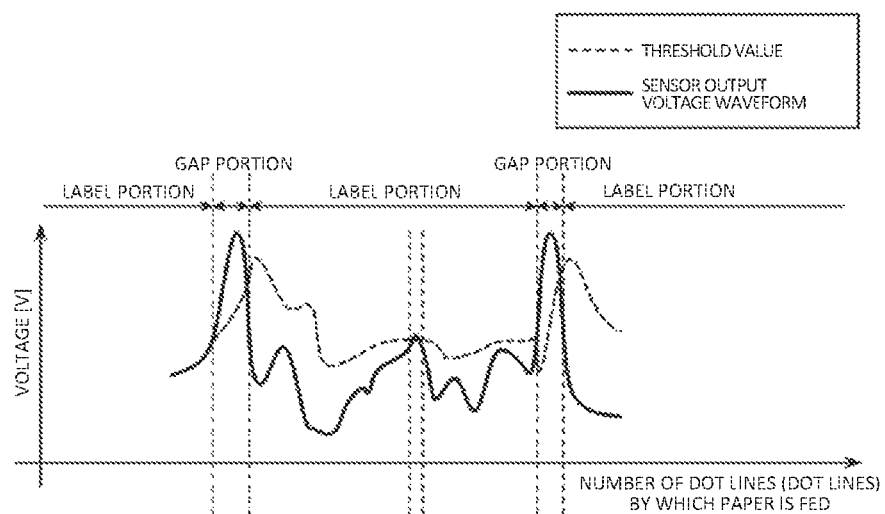
FIGS. 7A and 7B are graphs for showing Example 6 of the voltage waveform detected by the printing system according to the at least one embodiment.
Figure 7B:
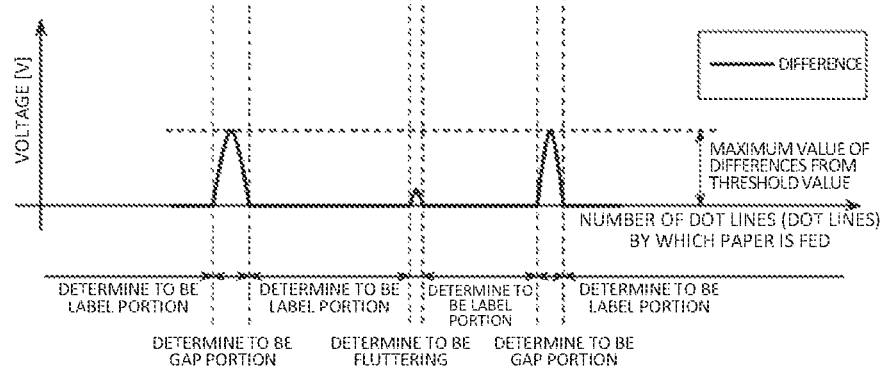

FIGS. 7A and 7B are graphs for showing Example 6 of the voltage waveform detected by the printing system according to the at least one embodiment. In FIGS. 7A and 7B, the horizontal axis indicates the number of dot lines (dot lines) by which paper is fed, and the vertical axis indicates a voltage (V). FIG. 7A shows the threshold value and an output waveform of voltage values output by the sensor 81 with respect to the number of dot lines by which paper is fed, and FIG. 7B shows a difference between the output waveform of the voltage values output by the sensor 81 and the threshold value with respect to the number of dot lines by which paper is fed. It should be noted, however, that in FIG. 7B, the difference is zero when the voltage output by the sensor 81 is less than the threshold value. In a label portion, an output waveform of the voltages output by the sensor 81 is lower than the threshold value, and the difference obtained by subtracting the threshold value from the voltage output by the sensor 81 is negative. The determiner 5-9 acquires, from the moving average calculator 5-8, the information specifying the voltage waveform, the information specifying the threshold value, the information specifying the maximum value of the moving averages of the previous gap portions, and the results of calculating the moving averages. The determiner 5-9 calculates, based on the acquired information specifying the voltage waveform and information specifying the threshold value, a difference between a voltage value output by the sensor 81 and the threshold value for each dot line. The determiner 5-9 determines whether the voltage value output by the sensor 81 is lower than the threshold value. When it is determined that the voltage value output by the sensor 81 is lower than the threshold value, the determiner 5-9 determines whether the voltage value output by the sensor 81 exceeds the maximum value of the moving averages of the previous gap portions. When it is determined that the voltage value output by the sensor 81 does not exceed the maximum value of the moving averages of the previous gap portions, the determiner 5-9 updates the threshold value based on the information specifying the maximum value of the moving averages of the previous gap portions and the acquired results of calculating the moving averages. The determiner 5-9 determines that a label portion has been detected when an output waveform of the voltages output by the sensor 81 is lower than a value obtained by updating the threshold value.

In a gap portion, an output waveform of the voltages output by the sensor 81 is higher than the threshold value, and the difference obtained by subtracting the threshold value from the voltage output by the sensor 81 is positive. The determiner 5-9 acquires, from the moving average calculator 5-8, the information specifying the voltage waveform, the information specifying the threshold value, the information specifying the maximum value of the moving averages of the previous gap portions, and the results of calculating the moving averages. The determiner 5-9 calculates, based on the acquired information specifying the voltage waveform and information specifying the threshold value, a difference between the voltage value output by the sensor 81 and the threshold value for each dot line. The determiner 5-9 determines whether the voltage value output by the sensor 81 is lower than the threshold value. When it is determined that the voltage value output by the sensor 81 is higher than the threshold value, the determiner 5-9 starts counting the number of dots by which paper is fed, and updates the maximum value of the moving averages of the previous gap portions by the voltage value output by the sensor 81. The determiner 5-9 updates the threshold value based on information specifying a value obtained by updating the maximum value of the moving averages of the previous gap portions, and the acquired results of calculating the moving averages. The determiner 5-9 determines whether an output waveform of voltages output by the sensor 81 is higher than the value obtained by updating the threshold value. When it is determined that the output waveform of the voltages output by the sensor 81 is higher than the value obtained by updating the threshold value, the determiner 5-9 determines whether the voltage value output by the sensor 81 is higher than the value obtained by updating the threshold value by a gap portion voltage threshold value VGapThr or more, and the number of dot lines for which the voltage value output by the sensor 81 exceeds the value obtained by updating the threshold value is a gap portion number-of-dot-lines threshold value NGapLng or more. In this specification, the gap portion voltage threshold value VGapThr is a voltage threshold value for determining to be a gap portion, and the gap portion number-of-dot-lines threshold value NGapLng is a threshold value of the number of dot lines for determining to be a gap portion.

A small peak may appear in a label portion in some cases. It is assumed that this small peak is caused by fluttering of label paper. The determiner 5-9 determines that fluttering of the label portion has been detected when it is determined that, although the voltage value output by the sensor 81 is higher than the value obtained by updating the threshold value, the difference is less than the gap portion voltage threshold value VGapThr, or the number of dot lines for which the voltage value output by the sensor 81 exceeds the value obtained by updating the threshold value is less than the gap portion number-of-dot-lines threshold value NGapLng. When it is determined that the voltage value output by the sensor 81 is higher than the value obtained by updating the threshold value by the gap portion voltage threshold value VGapThr or more, and the voltage value output by the sensor 81 exceeds the value obtained by updating the threshold value for the gap portion number-of-dot-lines threshold value NGapLng or more, the determiner 5-9 determines whether the voltage value output by the sensor 81 is the value obtained by updating the maximum value of the moving averages of the previous gap portions or less after the paper is fed by an out-of-paper number-of-dot-lines threshold value $N_{NoPap}$. In this specification, the out-of-paper number-of-dot-lines threshold value $N_{NoPap}$ is a threshold value of the number of dot lines for determining to be out of paper. The determiner 5-9 determines that a gap portion has been detected when, after the paper is fed by the out-of-paper number-of-dot-lines threshold value $N_{NoPap}$, the voltage value output by the sensor 81 is the value obtained by updating the maximum value of the moving averages of the previous gap portions or less.

Figure 8:
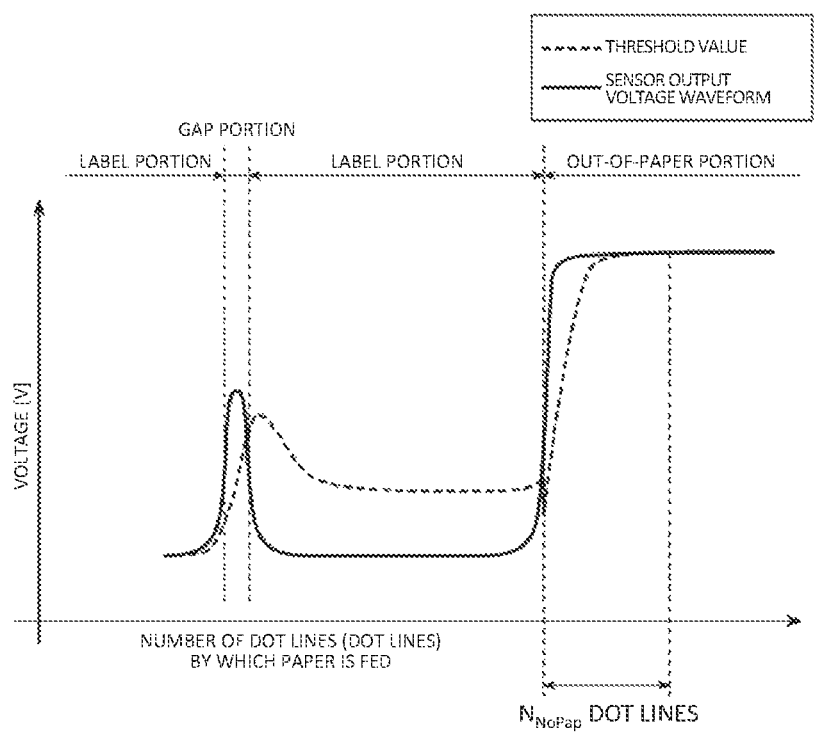
FIG. 8 is a graph for showing Example 7 of the voltage waveform detected by the printing system according to the at least one embodiment.

FIG. 8 is a graph for showing Example 7 of the voltage waveform detected by the printing system according to the at least one embodiment. In FIG. 8, the horizontal axis indicates the number of dot lines (dot lines) by which paper is fed, and the vertical axis indicates a voltage (V). Referring to FIG. 8, description is given of a case in which the determiner 5-9 detects an out-of-paper portion based on the information specifying the voltage waveform and the information specifying the threshold value. When it is determined that the voltage value output by the sensor 81 is higher than the value obtained by updating the threshold value by the gap portion voltage threshold value VGapThr or more, and the voltage value output by the sensor 81 exceeds the value obtained by updating the threshold value for the gap portion number-of-dot-lines threshold value NGapLng or more, the determiner 5-9 determines whether the voltage value output by the sensor 81 is the value obtained by updating the maximum value of the moving averages of the previous gap portions or less after the paper is fed by the out-of-paper number-of-dot-lines threshold value $N_{NoPap}$. The determiner 5-9 determines that running out of paper has been detected when the voltage value output by the sensor 81 is not the value obtained by updating the maximum value of the moving averages of the previous gap portions or less after the paper is fed by the out-of-paper number-of-dot-lines threshold value $N_{NoPap}$.

All or a part of each of the command analyzer 5-3, the print data generator 5-4, the printer controller 5-5, the conveyance controller 5-6, the detector 5-7, the moving average calculator 5-8, and the determiner 5-9 is a software function module implemented by, for example, a processor such as a CPU executing a control program stored in the storage 5-2. All or a part of each of the command analyzer 5-3, the print data generator 5-4, the printer controller 5-5, the conveyance controller 5-6, the detector 5-7, the moving average calculator 5-8, and the determiner 5-9 may be implemented by hardware such as an LSI device, an ASIC, or an FPGA, or may be implemented by a combination of the software function module and the hardware.

Figure 9:
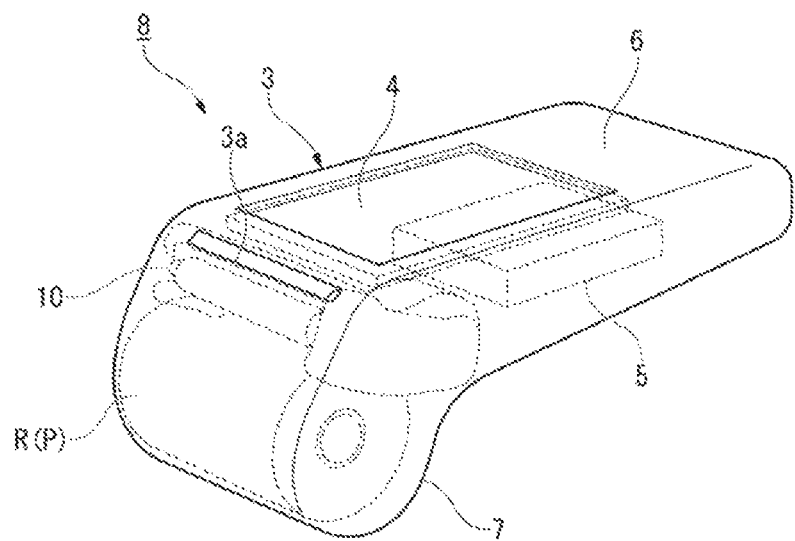
FIG. 9 is a perspective view of a printer apparatus in at least one embodiment of the present invention.

The mechanism device 9 includes the printing unit 10 and the sensor 81. The printing unit 10 and the sensor 81 are described. FIG. 9 is a perspective view of the printer apparatus in at least one embodiment of the present invention. As illustrated in FIG. 9, the printer apparatus 8 is configured so that printing can be executed on recording paper P. The recording paper P is thermal paper which is colored when heat is applied, and is suitably used for printing various labels, receipts, or tickets, for example. The recording paper P is set in the printer apparatus 8 under a state of roll paper R wound so as to have a hollow hole, and printing is executed on a portion pulled out from the roll paper R.

The printer apparatus 8 includes a casing 3, a display 4, the processor 5, and the printing unit 10. The casing 3 is formed of plastics, such as a composite material of acrylonitrile butadiene styrene (ABS) or ABS and polycarbonate, or a metal material into a hollow box shape. The casing 3 includes a main body portion 6 having a rectangular parallelepiped shape, and a roll paper container 7 projecting on one side of a thickness direction of the main body portion 6 in one end portion in a lengthwise direction of the main body portion 6.

In the one end portion in the lengthwise direction of the main body portion 6, the printing unit 10 is received. Further, in an end surface in the one end portion in the lengthwise direction of the main body portion 6, a discharge port 3a is formed. Through the discharge port 3a, the recording paper P on which printing has been executed through the printing unit 10 is discharged. On a main surface on a side opposite to the roll paper container 7 in the thickness direction of the main body portion 6, the display 4 is arranged. The display 4 is, for example, a liquid crystal panel, and is connected to the processor 5 to display various kinds of information. In the roll paper container 7, the roll paper R is received.

Figure 10:
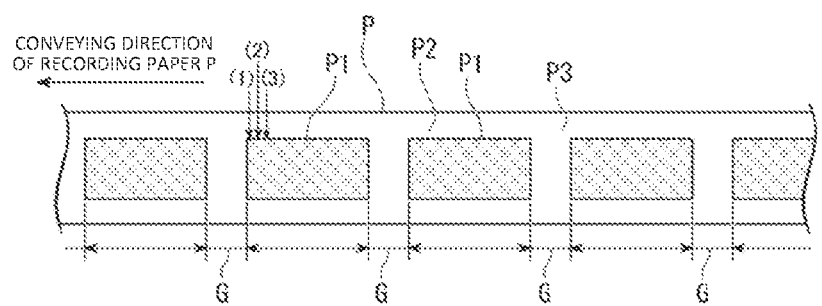
FIG. 10 is a plan view of recording paper P in at least one embodiment of the present invention.

FIG. 10 is a plan view of the recording paper P in at least one embodiment of the present invention. As illustrated in FIG. 10, the recording paper P has a plurality of peelable label portions P1 formed at predetermined intervals in a printing surface of the paper. The label portions P1 are formed by die-cutting a heat sensitive layer bonded to release paper P3 (base paper) on a side opposite to the printing surface of the recording paper P, and a plurality of label portions P1 are formed at intervals in a lengthwise direction of the recording paper P. A liner P2 having a frame shape is formed around the label portions P1. The label portions P1 are peelable from the release paper P3 while leaving the liner P2. In this manner, the recording paper P in the at least one embodiment is label release paper with the liner P2. The recording paper P is conveyed in the direction of the arrow. A portion of the release paper P3 between adjacent label portions P1 is referred to as "gap portion G." In FIG. 10, "(1)" indicates a position of a head end surface, "(2)" indicates a position of a heater, and "(3)" indicates a position of the sensor 81 in a case in which it is determined to be out of paper.

Figure 11:
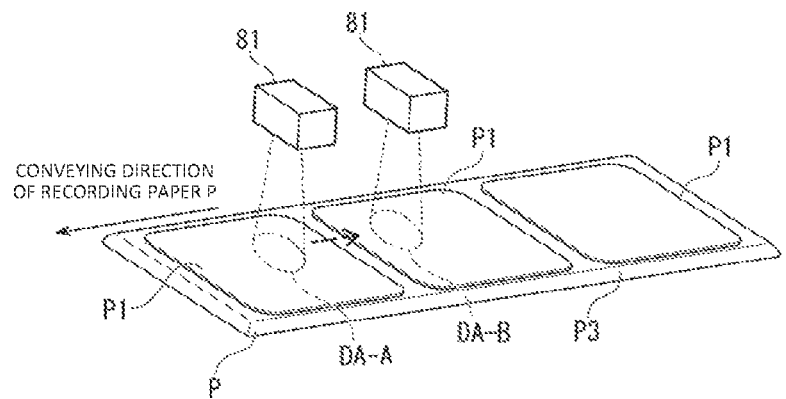
FIG. 11 is a view for illustrating Example 1 of operation of the printing system according to the at least one embodiment.

FIG. 11 is a view for illustrating Example 1 of operation of the printing system according to the at least one embodiment. FIG. 11 shows an example of an area on the recording paper P in which the moving average calculator 5-8 measures voltage values of a voltage waveform to be used in calculating moving averages in the printing system 1. The sensor 81 sequentially irradiates light on a detection area DA-A, a detection area DA-B, . . . of the conveyed recording paper P, sequentially detects reflected light of the irradiated light, and sequentially outputs the voltage values based on results of detecting the reflected light of the light. The detector 5-7 detects the voltage values sequentially output by the sensor 81. The detector 5-7 acquires the voltage waveform based on the results of detecting the voltage values sequentially output by the sensor 81. The moving average calculator 5-8 calculates the moving averages of the voltage values based on the voltage waveform acquired by the detector 5-7.

Figure 12:
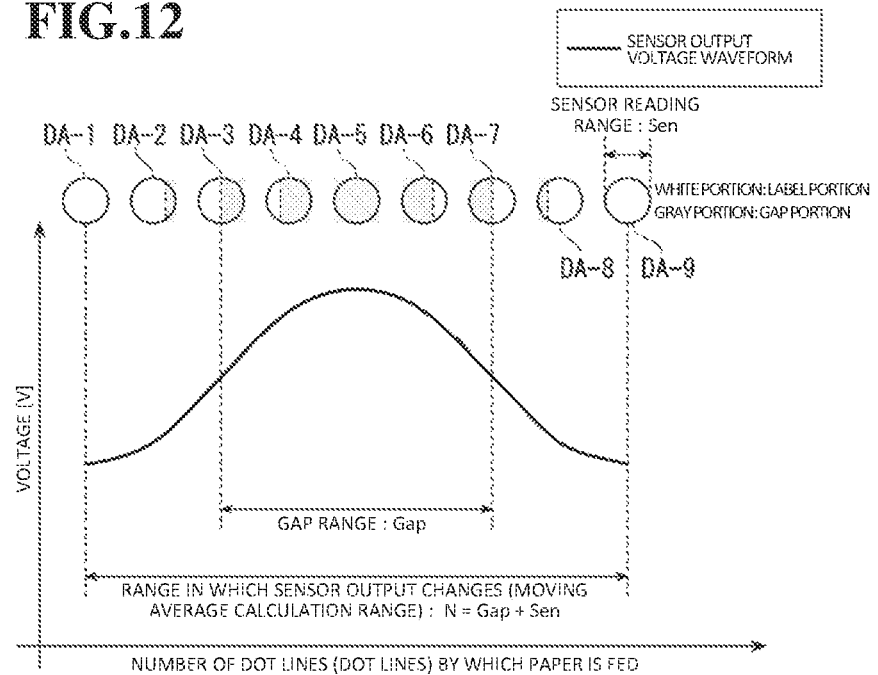
FIG. 12 is a diagram for showing Example 2 of the operation of the printing system according to the at least one embodiment.

FIG. 12 is a diagram for illustrating Example 2 of the operation of the printing system according to the at least one embodiment. FIG. 12 shows voltage values output by the sensor 81 sequentially irradiating light on a detection area DA-1 to a detection area DA-9 of the conveyed recording paper P, based on results of detecting reflected light of the light in the printing system 1. When the sensor 81 irradiates light on the detection area DA-1 of the recording paper P, the detection area DA-1 corresponds to a label portion, and hence a voltage value detected by the detector 5-7 is a low value. When the sensor 81 irradiates light on the detection area DA-2 of the recording paper P, the detection area DA-2 includes a gap portion in a part thereof as compared to the detection area DA-1, and hence a voltage value detected by the detector 5-7 is a high value as compared to the detection area DA-1. When the sensor 81 irradiates light on the detection area DA-3 of the recording paper P, the detection area DA-3 has a larger gap portion included in a part thereof as compared to the detection area DA-2, and hence a voltage value detected by the detector 5-7 is a high value as compared to the detection area DA-2. When the sensor 81 irradiates light on the detection area DA-4 of the recording paper P, the detection area DA-4 has an even larger gap portion included in a part thereof as compared to the detection area DA-3, and hence a voltage value detected by the detector 5-7 is a high value as compared to the detection area DA-3. When the sensor 81 irradiates light on the detection area DA-5 of the recording paper P, the detection area DA-5 corresponds to the gap portion, and hence a voltage value detected by the detector 5-7 is the highest value. When the sensor 81 irradiates light on the detection area DA-6 of the recording paper P, the detection area DA-6 includes a label portion in a part thereof as compared to the detection area DA-5, and hence a voltage value detected by the detector 5-7 is a low value as compared to the detection area DA-5.

When the sensor 81 irradiates light on the detection area DA-7 of the recording paper P, the detection area DA-7 has a larger label portion included in a part thereof as compared to the detection area DA-6, and hence a voltage value detected by the detector 5-7 is a low value as compared to the detection area DA-6. When the sensor 81 irradiates light on the detection area DA-8 of the recording paper P, the detection area DA-8 has an even larger label portion included in a part thereof as compared to the detection area DA-7, and hence a voltage value detected by the detector 5-7 is a low value as compared to the detection area DA-7. When the sensor 81 irradiates light on the detection area DA-9 of the recording paper P, the detection area DA-9 corresponds to the label portion, and hence a voltage value detected by the detector 5-7 is the lowest value. In FIG. 12, the detection area DA-1 to the detection area DA-9 are a range in which the voltage value output by the sensor 81 changes. The range in which the voltage value output by the sensor 81 changes is a range in which the moving average calculator 5-8 calculates moving averages of the voltage values. The detection area DA-3 to the detection area DA-7 are a range of the gap portion G. For example, the moving average calculator 5-8 calculates moving averages for each range in which the voltage value output by the sensor 81 changes. In this case, N dot lines of the voltage values output by the sensor 81 correspond to the range in which the voltage value output by the sensor 81 changes. The range in which the voltage value output by the sensor 81 changes is changed depending on a range (length) of the gap portion, and hence N is set based on the range (length) of the gap portion.

Figure 13:
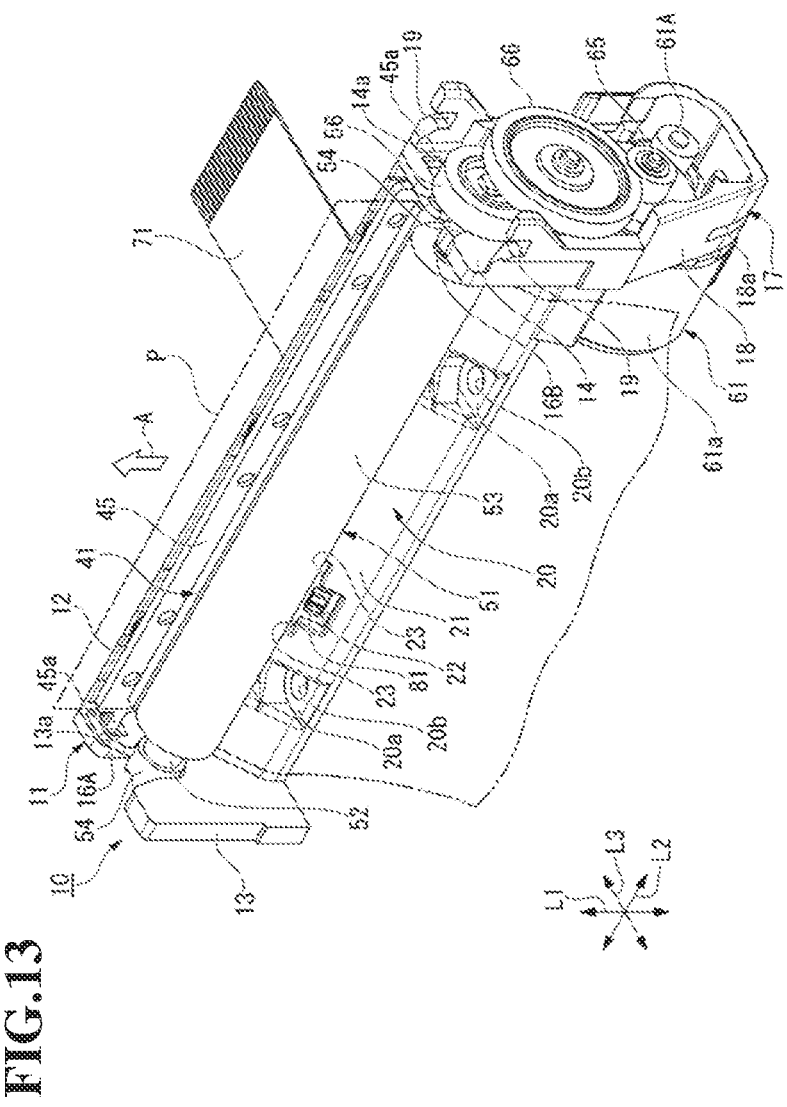
FIG. 13 is a perspective view of a front side of a printing unit in at least one embodiment of the present invention.
Figure 14:
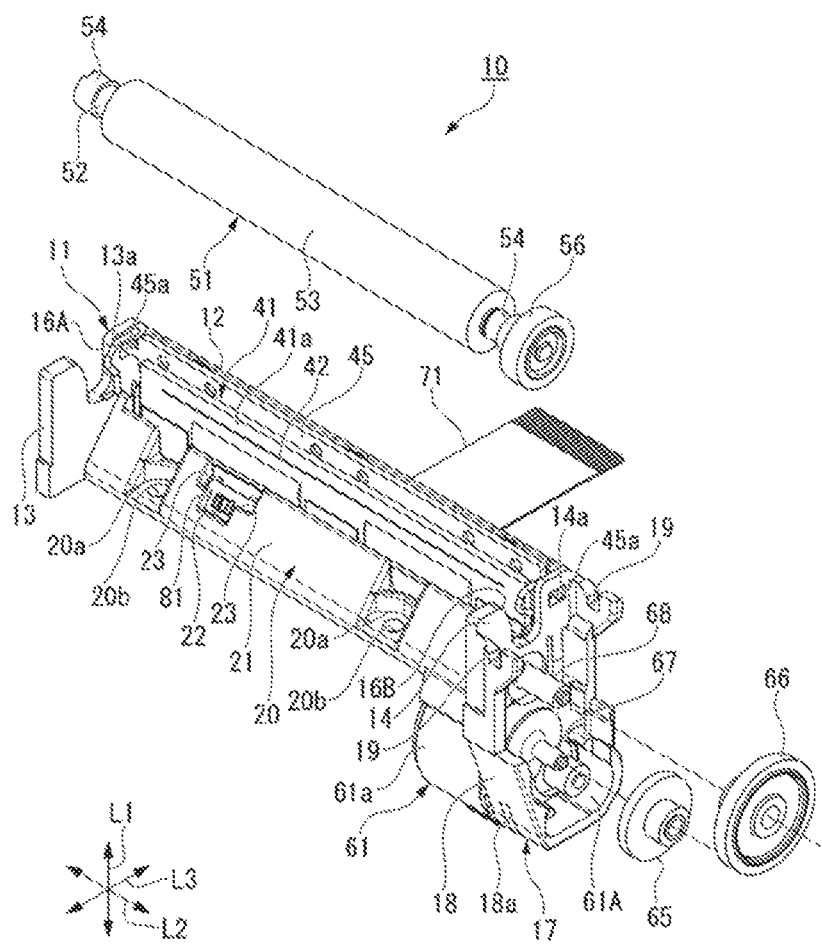
FIG. 14 is an exploded perspective view of the front side of the printing unit in the one embodiment.
Figure 15:
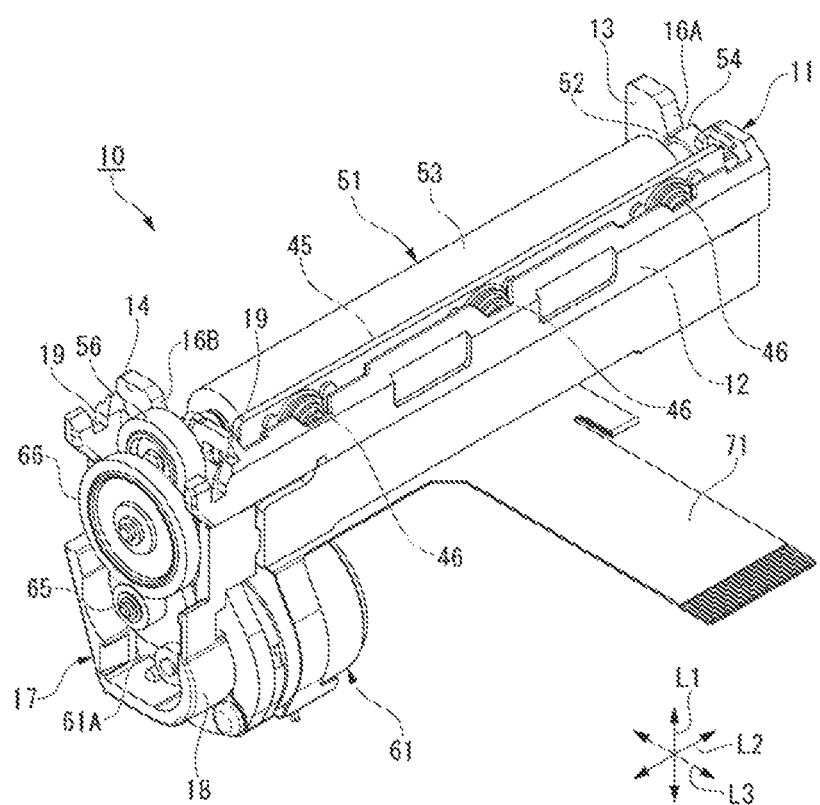
FIG. 15 is a perspective view of a back side of the printing unit in the one embodiment.

FIG. 13 is a perspective view of a front side of the printing unit in at least one embodiment of the present invention. FIG. 14 is an exploded perspective view of the front side of the printing unit in the one embodiment. FIG. 15 is a perspective view of a back side of the printing unit in the one embodiment. As illustrated in FIG. 13, the printing unit 10 includes a platen roller 51 with a driven gear 56, a motor 61 which rotates the platen roller 51, a main body frame 11 which rotatably supports the platen roller 51 and on which the motor 61 is mounted, a first reduction gear 65 and a second reduction gear 66 which reduce a driving force of the motor 61 and transmit the reduced driving force to the driven gear 56, and a thermal head 41 to be brought into pressure contact with a peripheral surface of the platen roller 51.

The printing unit 10 discharges the recording paper P that has passed between the platen roller 51 and the thermal head 41 toward the direction pointed by the arrow A. In the following, mainly in description of the printing unit 10, the direction along the arrow A is defined as an up-and-down direction L1. Further, an axial direction in which an axis of rotation of the platen roller 51 extends, and which is a direction orthogonal to the up-and-down direction L1 is defined as a left-and-right direction L2. Still further, a direction orthogonal to the up-and-down direction L1 and the left-and-right direction L2 is defined as a front-and-rear direction L3.

In the up-and-down direction L1, a side on which the recording paper P is discharged (side directed by the arrow A) is defined as "up," and the opposite side is defined as "down." Further, in the left-and-right direction L2, a side on which the motor 61 is arranged is defined as "right," and the opposite side is defined as "left." Still further, in the front-and-rear direction L3, the side in which the platen roller 51 is arranged is defined as "front," and the opposite side on which the thermal head 41 is arranged is defined as "rear."

The main body frame 11 is formed of a plate material made of, for example, a polycarbonate resin containing glass fiber. The main body frame 11 is formed into a U shape that is open toward the front as viewed in the up-and-down direction L1. Specifically, the main body frame 11 includes a back plate portion 12 extending in the left-and-right direction L2, a first side wall portion 13 erected from an end portion on one side (left side) in the left-and-right direction L2 of the back plate portion 12 toward the front side, a second side wall portion 14 erected from an end portion on the other side (right side) in the left-and-right direction L2 of the back plate portion 12 toward the front side and the lower side, and a paper guide portion 20 provided between the first side wall portion 13 and the second side wall portion 14.

The back plate portion 12 is formed into a plate shape having a thickness in the front-and-rear direction L3. The first side wall portion 13 is formed into a plate shape having a thickness in the left-and-right direction L2. In an upper edge of the first side wall portion 13, a first roller insertion groove 16A cut toward the lower side is formed. The second side wall portion 14 is formed into a plate shape having a thickness in the left-and-right direction L2. In an upper edge of the second side wall portion 14, a second roller insertion groove 16B cut toward the lower side is formed.

The second roller insertion groove 16B is formed so that a shape and a formation position thereof as viewed in the left-and-right direction L2 match those of the first roller insertion groove 16A. In the first roller insertion groove 16A and the second roller insertion groove 16B, the platen roller 51 is removably inserted. The second side wall portion 14 extends from the end portion on the other side (right side) in the left-and-right direction L2 of the back plate portion 12 toward the front side, and further extends toward the lower side.

On a lower side of a connection portion between the second side wall portion 14 and the back plate portion 12 of the second side wall portion 14, the motor 61 is mounted. The motor 61 is mounted to the second side wall portion 14 from the inside of the left-and-right direction L2, and an output shaft 61A of the motor 61 passes through the second side wall portion 14 and projects to the outside in the left-and-right direction L2 of the second side wall portion 14. The motor 61 is connected to the processor 5 via a flexible printed circuit board 71 on which a wiring pattern (not shown) is printed and wired. The motor 61 is driven based on a signal from the processor 5.

On an outer side of the second wall portion 14, a gear box portion 17 is formed. The gear box portion 17 has a peripheral wall portion 18 erected from a peripheral edge of the second side wall portion 14 toward the outer side in the left-and-right direction L2. The peripheral wall portion 18 is formed into a U shape that is open toward the upper side as viewed in the left-and-right direction L2. The gear box portion 17 is open toward the outer side in the left-and-right direction L2.

In each of an upper edge on a front side of the peripheral wall portion 18, and an upper edge on a rear side thereof, a recessed portion 19 that is recessed toward the lower side is formed. A pair of recessed portions 19 are formed so that shapes and positions thereof match each other as viewed in the front-and-rear direction L3. Further, a hole 18a is formed in a lower portion of the peripheral wall portion 18. With the pair of recessed portions 19 and the hole 18a, a cover member (not shown) which covers the gear box portion 17 is engaged.

Inside the gear box portion 17, the first reduction gear 65 and the second reduction gear 66 are mounted. As illustrated in FIG. 14, the first reduction gear 65 is supported to be freely rotatable by a first rotary shaft 67 erected from the second side wall portion 14. The first reduction gear 65 intermeshes with the output shaft 61A of the motor 61. The second reduction gear 66 is supported to be freely rotatable by a second rotary shaft 68 erected from the second side wall portion 14 on the upper side of the first rotary shaft 67. The second reduction gear 66 intermeshes with the first reduction gear 65.

The paper guide portion 20 is formed into a substantially right triangular prism shape extending along the left-and-right direction L2. The paper guide portion 20 has an end portion on the one side (left side) in the left-and-right direction L2 connected to an inner surface of the first side wall portion 13, and has an end portion on the other side (right side) in the left-and-right direction L2 connected to an inner surface of the second side wall portion 14. The paper guide portion 20 has formed therein a pair of mounting portions 20a which are recessed toward the lower side as viewed in the front-and-rear direction L3.

The pair of mounting portions 20a are formed via an interval in the left-and-right direction L2. In a bottom portion of each of the mounting portions 20a, a through hole 20b which passes through the bottom portion of the mounting portion 20a in the up-and-down direction is formed. The main body frame 11 is mounted on the casing 3 by inserting fastening members, such as bolts, in the through holes 20b of the paper guide portion 20.

The thermal head 41 is configured to execute printing on the recording paper P. The thermal head 41 is formed into a rectangular shape with a lengthwise direction thereof being the left-and-right direction L2 as viewed in the front-and-rear direction L3. The thermal head 41 is arranged under a state in which the lengthwise direction thereof and a width direction of the recording paper P match each other. On a head surface 41a of the thermal head 41, a large number of heating elements 42 are arrayed in the left-and-right direction L2.

The head surface 41a is opposed to the printing surface of the recording paper P, and is configured so that the recording paper P can be pinched together with an outer peripheral surface of the platen roller 51. The thermal head 41 is connected to the processor 5 via the flexible printed circuit board 71, and a driver IC (not shown) mounted on the thermal head 41 controls heat generation of the heating elements 42 based on a signal from the processor 5. The thermal head 41 is controlled in heat generation of the heating elements 42 to print various characters or graphics, for example, on the printing surface of the recording paper P.

The thermal head 41 is bonded and fixed to a head support member 45 supported by the main body frame 11. The head support member 45 is a plate-like member with a lengthwise direction thereof being the left-and-right direction L2, and has the thermal head 41 bonded and fixed to a front surface thereof. The head support member 45 is arranged between the first side wall portion 13 and the second side wall portion 14, and is arranged between the back plate portion 12 and the paper guide portion 20.

As illustrated in FIG. 15, elastic members 46 which urge the head support member 45 and the back plate portion 12 toward directions of being separated from each other are interposed between the head support member 45 and the back plate portion 12. In other words, the elastic members 46 are configured to always press the head support member 45 toward the front side. A plurality of (in the at least one embodiment, three) elastic members 46 are arrayed at intervals in the left-and-right direction L2.

As illustrated in FIG. 14, a pair of stoppers 45a for regulating a pivot range of the head support member 45 are formed in an upper end portion of the head support member 45. The pair of stoppers 45a are formed into a substantially quadrangular prism shape, and extend toward the outer side in the left-and-right direction L2 of the head support member 45. The pair of stoppers 45a are inserted in a rectangular hole 13a formed in an upper portion of the first side wall portion 13 of the main body frame 11, and a rectangular hole 14a formed in an upper portion of the second side wall portion 14, respectively. The stoppers 45a are configured to move in the hole 13a and the hole 14a along with the pivoting of the head support member 45, and to be able to be brought into contact with inner surface walls of the hole 13a and the hole 14a, respectively. The stoppers 45a regulate a pivot amount of the head support member 45 by being brought into contact with the inner surface walls of the hole 13a and the hole 14a, respectively.

As illustrated in FIG. 13, the platen roller 51 is arranged to be opposed to the thermal head 41, and rotates under a state of pinching the recording paper P together with the thermal head 41 to feed the recording paper P in a direction pointed by the arrow A. The platen roller 51 includes a roller shaft 52, a roller main body 53 externally mounted around the roller shaft 52, and a pair of bearings 54 mounted to both ends of the roller shaft 52. The roller shaft 52 is formed to be slightly longer than a separation distance between the first side wall portion 13 and the second side wall portion 14 of the main body frame 11. The roller main body 53 is formed of rubber, for example, and is arranged uniformly over the entirety of the roller shaft 52 except for the both ends thereof along the left-and-right direction L2.

The pair of bearings 54 mounted to the both ends of the platen roller 51 are inserted in the first roller insertion groove 16A and the second roller insertion groove 16B of the main body frame 11, respectively. As a result, the platen roller 51 is held to be rotatable with respect to, and to be removable from the main body frame 11. The platen roller 51 is provided to pinch the recording paper P pulled out from the roll paper R under the state of being inserted in the first roller insertion groove 16A and the second roller insertion groove 16B, so that the roller main body 53 is brought into contact with the thermal head 41.

As illustrated in FIG. 13, the driven gear 56 is fixed to an end portion on the other side (right side) in the left-and-right direction L2 of the platen roller 51. The driven gear 56 is mounted to an upper portion of the gear box portion 17 when the platen roller 51 is held by the first side wall portion 13 and the second side wall portion 14. At this time, the driven gear 56 overlaps the second reduction gear 66 and is arranged inside the second reduction gear 66 as viewed in the left-and-right direction L2 to intermesh with the second reduction gear 66. As a result, a rotational driving force from the motor 61 is transmitted to the driven gear 56 via the first reduction gear 65 and the second reduction gear 66. The platen roller 51 rotates under the state of being held by the first side wall portion 13 and the second side wall portion 14, and can feed the recording paper P.

Figure 16:
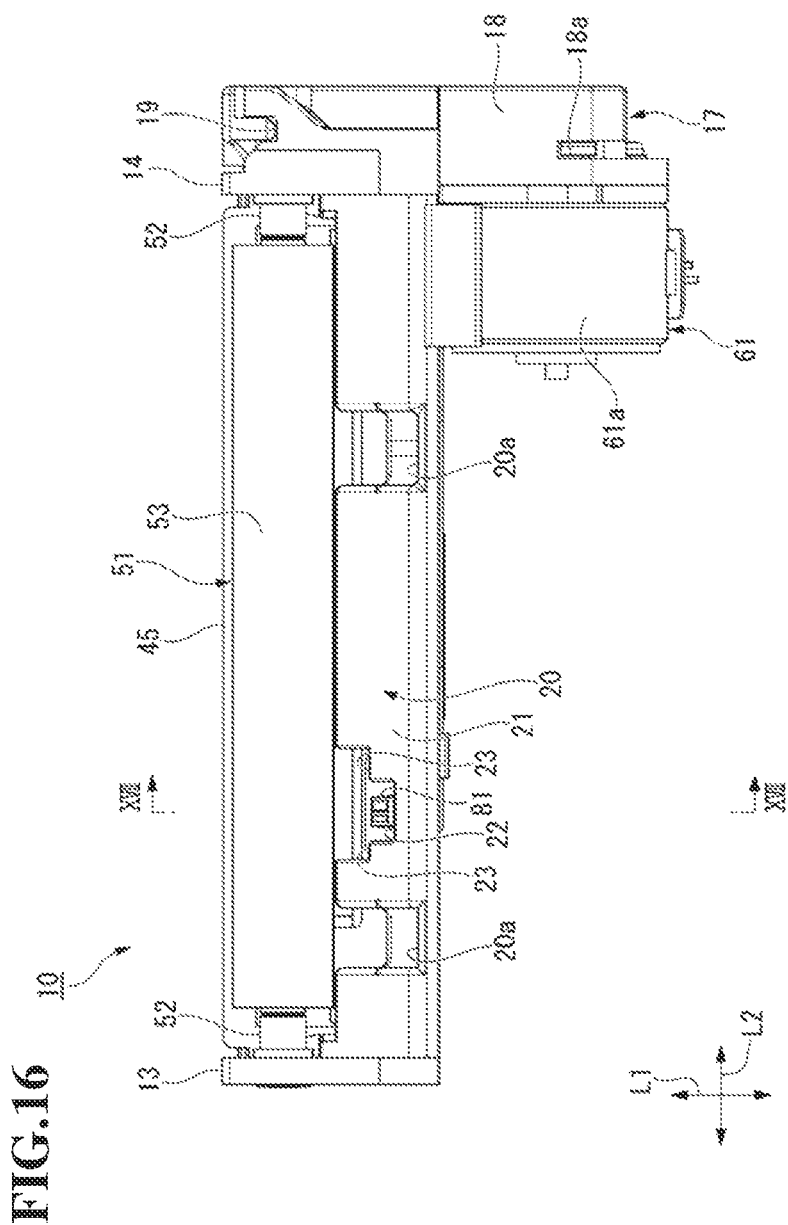
FIG. 16 is a front view of the printing unit in the one embodiment.
Figure 17:
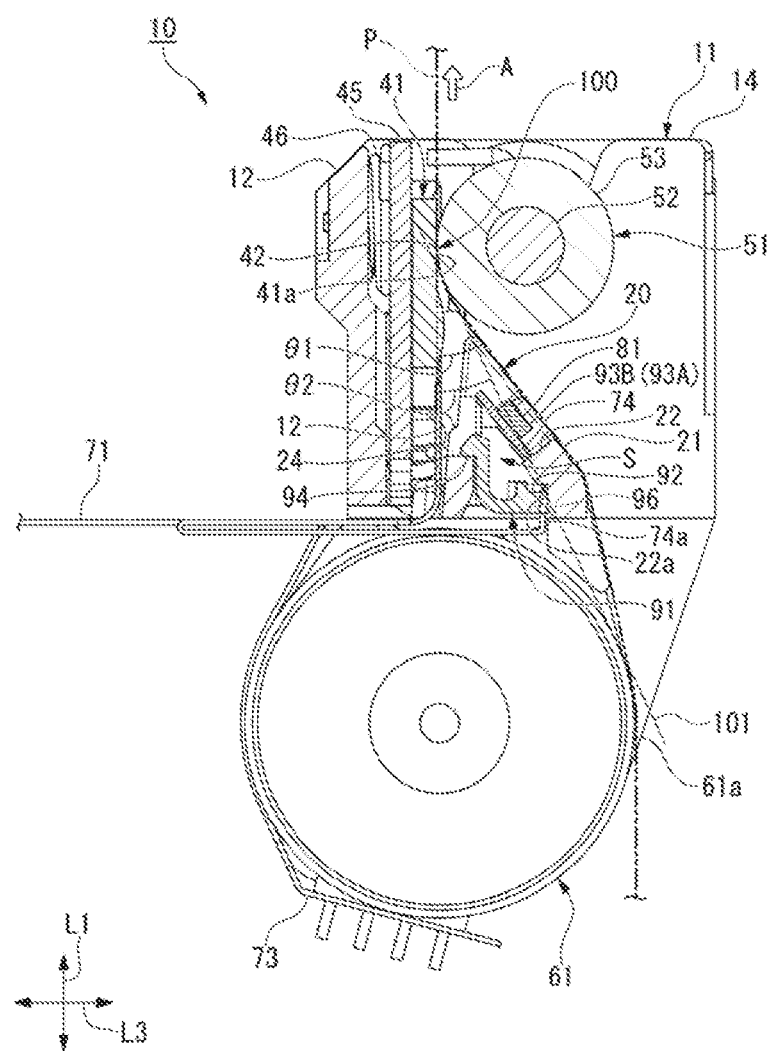
FIG. 17 is a sectional view as viewed in the direction of the arrow XVII-XVII of FIG. 16.
Figure 18:
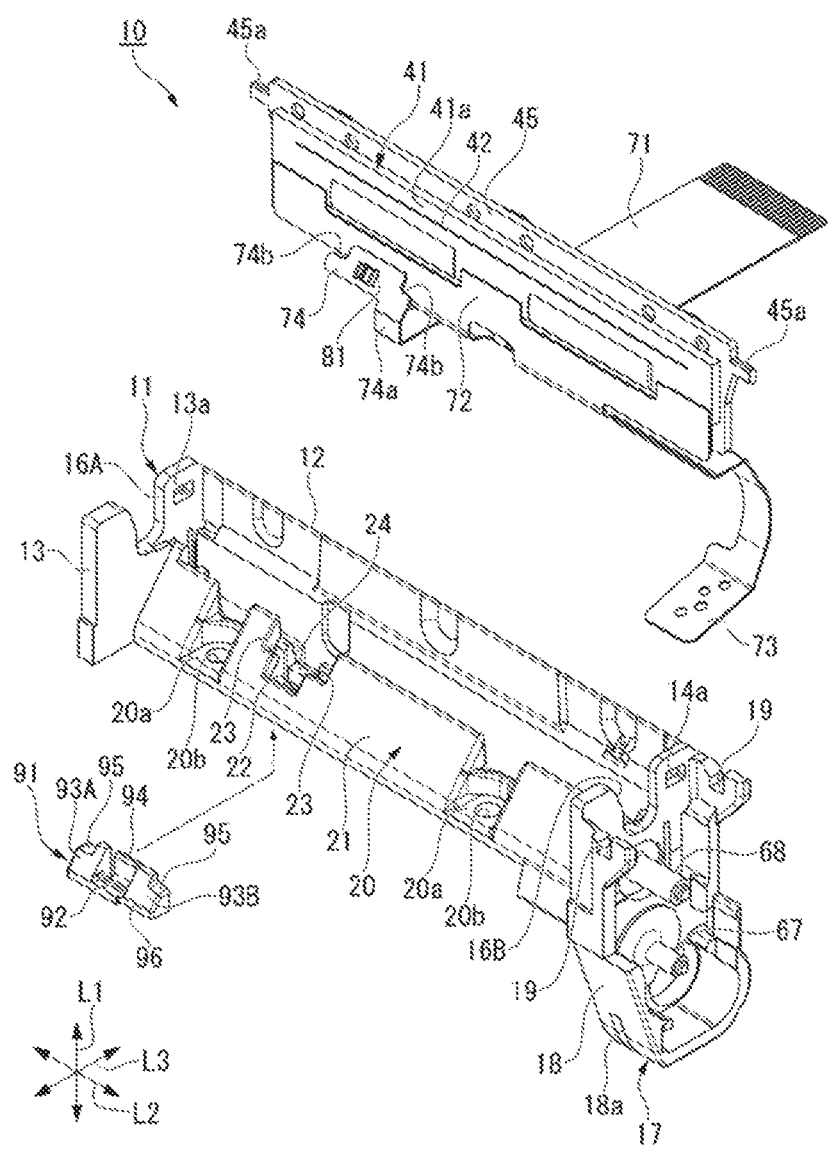
FIG. 18 is an exploded perspective view of a front side of electrical components of the printing unit in the one embodiment.

FIG. 16 is a front view of the printing unit in the one embodiment. FIG. 17 is a sectional view as viewed in the direction of the arrow XVII-XVII of FIG. 16. FIG. 18 is an exploded perspective view of a front side of electrical components of the printing unit in the one embodiment. As illustrated in FIG. 17, the paper guide portion 20 has an inclined guide surface 21 for inserting the recording paper P from an acute angle direction toward a printing area 100 of the thermal head 41.

The term "printing area 100" as used herein refers to an area opposed to the platen roller 51 of the head surface 41a of the thermal head 41 in which the heating elements 42 are provided. The printing area 100 in a strict sense refers to an area of the head surface 41a that is in press contact with the peripheral surface of the platen roller 51. The printing area 100 in the at least one embodiment is a plane area extending in the up-and-down direction L1 and the left-and-right direction L2.

The inclined guide surface 21 is inclined at an angle θ1 with respect to the printing area 100. The angle θ1 is an acute angle of less than 90° with the printing area 100 being a reference plane of 0°. It is preferred that the angle θ1 be an acute angle of 57.5° or less. With this configuration, the recording paper P can be inserted in the printing area 100 while preventing peeling of a label portion P1 without applying strong warpage to the recording paper P. In other words, it is preferred that an upper limit of the angle θ1 be 57.5°.

In contrast, it is preferred that a lower limit of the angle θ1 be an angle θ2. The angle θ2 is an angle formed by a tangent 101 drawn from the printing area 100 to a peripheral surface 61a of the motor 61 with respect to the printing area 100. As illustrated in FIG. 13, the peripheral surface 61a of the motor 61 is arranged in a paper passage of the recording paper P to guide the recording paper P. When the angle θ1 is less than the angle θ2, the recording paper P disadvantageously floats with respect to the inclined guide surface 21. In other words, it is preferred that the inclined guide surface 21 be inclined at an angle of the angle θ2 or more with respect to the printing area 100.

The inclined guide surface 21 in the at least one embodiment is inclined at an acute angle of 37.5° with respect to the printing area 100. When the inclined guide surface 21 is inclined at 37.5°, minimum interior space required to lay out the sensor 81 on the inclined guide surface 21 can be secured in the paper guide portion 20. In this manner, the angle θ1 is preferably the angle θ2 or more and 57.5° or less, and is more preferably 37.5° or more and 57.5° or less.

As illustrated in FIG. 16, an opening portion 22 in which the sensor 81 is arranged is formed in the inclined guide surface 21. The opening portion 22 is formed in a T shape as viewed from the front. The opening portion 22 is arranged between the pair of mounting portions 20a in the left-and-right direction of the inclined guide surface 21. The opening portion 22 is arranged between the pair of mounting portions 20a to be closer to the mounting portion 20a on the one side (left side) in the left-and-right direction.

Figure 19:
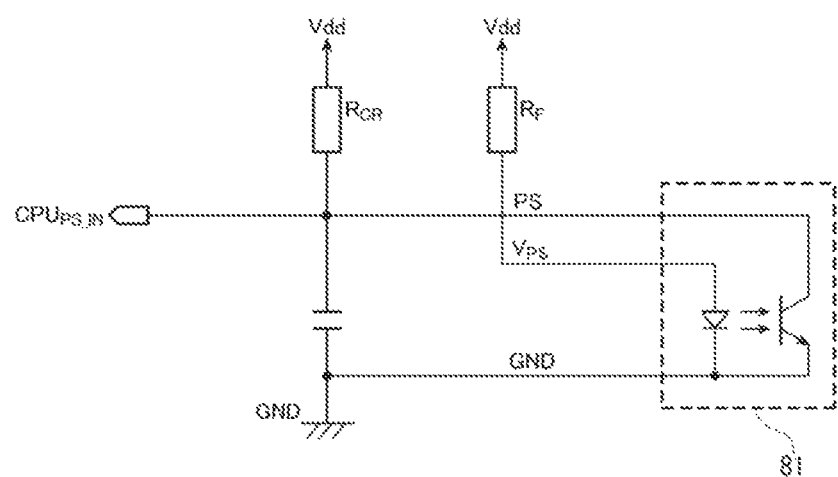
FIG. 19 is a diagram for illustrating an example of a sensor of the printing system according to the at least one embodiment.

The sensor 81 which detects the recording paper P is arranged in the opening portion 22. FIG. 19 is a diagram for illustrating an example of the sensor of the printing system according to the at least one embodiment. An example of the sensor 81 is a photoreflector. A photoreflector includes a light emitting element and a light receiving element, and detects existence (presence/absence) and a position of an object by reflected light from a detected object. The sensor 81 may be a non-contact sensor other than the photoreflector. As an another example, the sensor 81 may be a contact sensor. The sensor 81 is provided on the flexible printed circuit board 71 as illustrated in FIG. 18.

The flexible printed circuit board 71 includes a head connecting portion 72 connected to the heating elements 42, a motor connecting portion 73 connected to the motor 61, and a sensor connecting portion 74 connected to the sensor 81. The sensor connecting portion 74 and the sensor 81 are inserted together with a sensor holder 91 in the opening portion 22 of the paper guide portion 20 from a bottom surface side of the paper guide portion 20. The sensor holder 91 is a resin molded part, and is removably engaged with the opening portion 22 of the paper guide portion 20.

Figure 20:
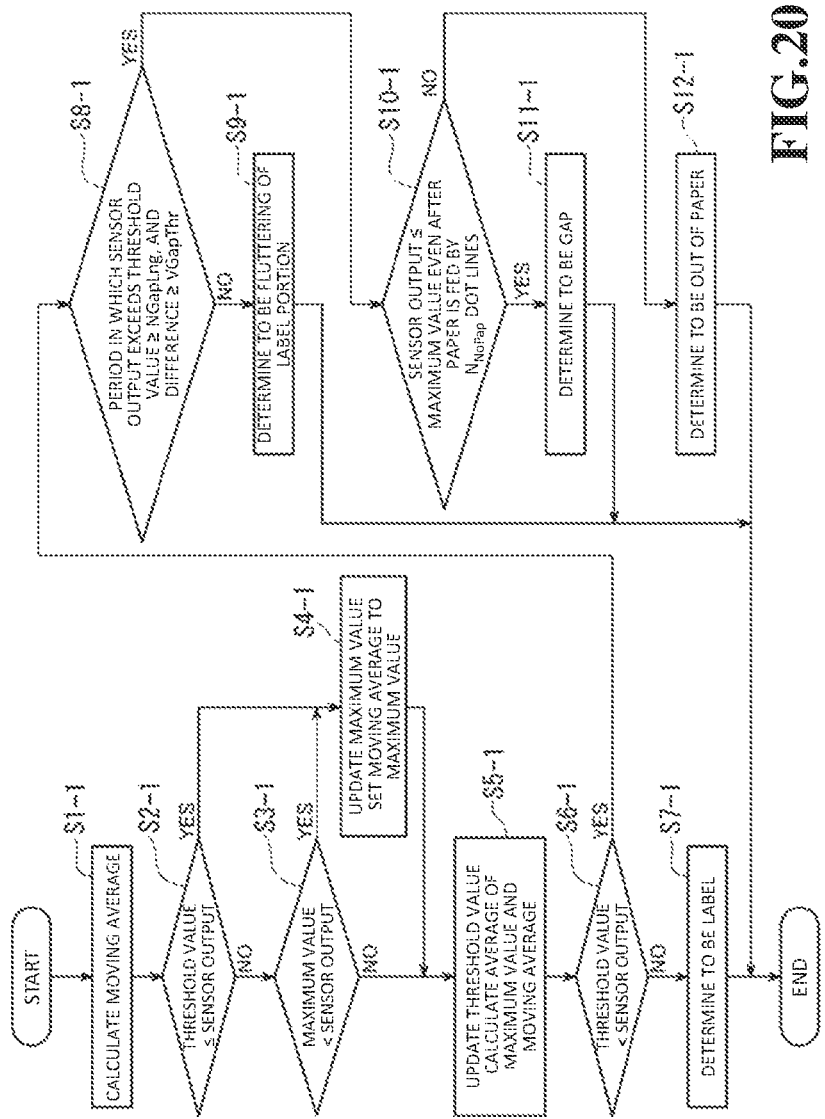
FIG. 20 is a flow chart for illustrating an example of operation of the printing system according to the at least one embodiment.

FIG. 20 is a flow chart for illustrating an example of operation of the printing system according to the at least one embodiment. FIG. 20 shows processing mainly performed by the printer apparatus 8 of the printing system 1.

(Step S1-1)

In the printer apparatus 8, the detector 5-7 detects a voltage value output by the sensor 81 based on a result of detecting reflected light of light, and acquires a voltage waveform based on results of detecting voltage values output by the sensor 81. The moving average calculator 5-8 calculates moving averages of the voltage values based on the voltage waveform acquired by the detector 5-7.

(Step S2-1)

In the printer apparatus 8, the moving average calculator 5-8 acquires information specifying a maximum value of moving averages of previous gap portions. The moving average calculator 5-8 calculates a threshold value based on the acquired information specifying the maximum value of the moving averages of the previous gap portions and the results of calculating the moving averages of the voltage values.

The determiner 5-9 acquires, from the moving average calculator 5-8, information specifying the voltage waveform, information specifying the threshold value, and the information specifying the maximum value of the moving averages of the previous gap portions, and the results of calculating the moving averages. The determiner 5-9 calculates a difference between a voltage value output by the sensor 81 and the threshold value for each dot line based on the acquired information specifying the voltage waveform and information specifying the threshold value. The determiner 5-9 determines whether the voltage value output by the sensor 81 is lower than the threshold value.

(Step S3-1)

In the printer apparatus 8, when it is determined that the voltage value output by the sensor 81 is lower than the threshold value, the determiner 5-9 determines whether the voltage value output by the sensor 81 exceeds the maximum value of the moving averages of the previous gap portions.

(Step S4-1)

In the printer apparatus 8, when it is determined that the voltage value output by the sensor 81 is higher than the threshold value, or when it is determined that the voltage value output by the sensor 81 exceeds the maximum value of the moving averages of the previous gap portions, the determiner 5-9 starts counting the number of dots by which paper is fed, and updates the maximum value of the moving averages of the previous gap portions by the voltage value output by the sensor 81.

(Step S5-1)

In the printer apparatus 8, the determiner 5-9 updates the threshold value when the voltage value output by the sensor 81 does not exceed the maximum value of the moving averages of the previous gap portions, or after the maximum value of the moving averages of the previous gap portions is updated by the voltage value output by the sensor 81.

(Step S6-1)

In the printer apparatus 8, the determiner 5-9 determines whether the output waveform of the voltages output by the sensor 81 is higher than a value obtained by updating the threshold value.

(Step S7-1)

In the printer apparatus 8, the determiner 5-9 determines that a label portion has been detected when the output waveform of the voltages output by the sensor 81 is less than the value obtained by updating the threshold value.

(Step S8-1)

In the printer apparatus 8, when it is determined that the output waveform of the voltages output by the sensor 81 is higher than the value obtained by updating the threshold value, the determiner 5-9 determines whether the voltage value output by the sensor 81 is higher than the value obtained by updating the threshold value by the gap portion voltage threshold value VGapThr or more, and the number of dot lines for which the voltage value output by the sensor 81 exceeds the value obtained by updating the threshold value is the gap portion number-of-dot-lines threshold value NGapLng or more.

(Step S9-1)

In the printer apparatus 8, the determiner 5-9 determines that fluttering of a label portion has been detected when it is determined that, although the voltage value output by the sensor 81 is higher than the value obtained by updating the threshold value, a difference therebetween is less than the gap portion voltage threshold value VGapThr, or the number of dot lines for which the voltage value output by the sensor 81 exceeds the value obtained by updating the threshold value is less than the gap portion number-of-dot-lines threshold value NGapLng.

(Step S10-1)

In the printer apparatus 8, when it is determined that the voltage value output by the sensor 81 is higher than the value obtained by updating the threshold value by the gap portion voltage threshold value VGapThr or more, and the voltage value output by the sensor 81 exceeds the value obtained by updating the threshold value for the gap portion number-of-dot-lines threshold value NGapLng or more, the determiner 5-9 determines whether the voltage value output by the sensor 81 is a value obtained by updating the maximum value of the moving averages of the previous gap portions or less after paper is fed by the out-of-paper number-of-dot-lines threshold value NNoPap.

(Step S11-1)

In the printer apparatus 8, the determiner 5-9 determines that a gap portion has been detected when the voltage value output by the sensor 81 is the value obtained by updating the maximum value of the moving averages of the previous gap portions or less after the paper is fed by the out-of-paper number-of-dot-lines threshold value NNoPap.

(Step S12-1)

In the printer apparatus 8, the determiner 5-9 determines that running out of paper has been detected when the voltage value output by the sensor 81 is not the value obtained by updating the maximum value of the moving averages of the previous gap portions or less after the paper is fed by the out-of-paper number-of-dot-lines threshold value NNoPap.

In the at least one embodiment described above, description has been given of the case in which the maximum value of the moving averages of the previous gap portions is used, but the present invention is not limited thereto. For example, when a logic of a circuit is configured in a manner opposite to the at least one embodiment, a minimum value of the moving averages of the previous gap portions may be used.

In the at least one embodiment described above, when a circuit is formed of a pull-up resistor, the moving average calculator 5-8 may calculate the threshold value for determining the gap portion, which is the portion between adjacent label portions, based on the maximum value of the moving averages of the previous gap portions. When the circuit is formed of a pull-down resistor, the moving average calculator 5-8 may calculate the threshold value for determining the gap portion, which is the portion between adjacent label portions, based on the minimum value of the moving averages of the previous gap portions. In the at least one embodiment described above, the printing system 1 may detect a gap of die-cut label paper, or may detect a mark on a mark sheet.

The printing system 1 according to the at least one embodiment includes: the conveyance controller 5-6 which controls a conveyor as the platen roller 51, the platen roller 51 conveying the recording paper P (paper) having a printing surface in which the peelable label portions P1 are formed at predetermined intervals; the sensor 81 which irradiates light on the paper conveyed by the conveyor to detect reflected light of the irradiated light; the detector 5-7 which detects an output of the sensor 81; the moving average calculator 5-8 which calculates moving averages of voltage values based on the output of the sensor 81 detected by the detector 5-7; and the determiner 5-9 which determines that a portion (gap portion G) between adjacent label portions P1 has been detected based on the moving averages of the voltage values calculated by the moving average calculator 5-8, and the output of the sensor 81. With this configuration, the printing system 1 can calculate the moving averages of the voltage values based on the reflected light of the light irradiated on the paper, and the portion (gap portion G) between the adjacent label portions P1 can be detected based on the calculated moving averages of the voltage values, and the output of the sensor 81. Consequently, erroneous detections of the portion (gap portion G) between the label portions P1 of the paper, in which the label portions P1 are formed, can be reduced. One cause for the erroneous detections of the portion (gap portion G) between the label portions P1 of the paper may include the erroneous detections by the sensor due to fluttering of the paper. In order to reduce the erroneous detections of the sensor due to the fluttering of the paper, it can be considered to increase the size of the sensor. However, if the printing system 1 is applied to a small-sized printer, it is difficult to increase the size of the sensor. In the at least one embodiment, the portion (gap portion G) between adjacent label portions P1 can be detected based on the moving averages of the voltage values and the output of the sensor 81, and hence the erroneous detections of the portion (gap portion G) between the label portions P1 of the paper can be reduced without increasing the size of the sensor.

Further, the moving average calculator 5-8 calculates a moving average for dot lines set based on a length of the portion between the adjacent label portions. With this configuration, the moving averages of the voltage values can be calculated. Still further, the moving average calculator 5-8 acquires a moving average corresponding to the portion between adjacent label portions P1 based on the moving averages, and calculates the threshold value for determining to be a portion between the label portions P1 based on the acquired moving average corresponding to the portion between the label portions P1 and the moving averages, and when the threshold value calculated by the moving average calculator 5-8 is the output of the sensor 81 or more, the determiner 5-9 determines that the portion between the adjacent label portions P1 has been detected. With this configuration, the threshold value for determining to be a portion between the label portions P1 can be calculated based on the moving average corresponding to the portion between the label portions P1 and the moving averages, and hence it can be determined that the portion between the adjacent label portions P1 has been detected.

Yet further, the determiner 5-9 determines that fluttering of a label portion P1 has been detected when the threshold value calculated by the moving average calculator 5-8 is less than the output of the sensor 81, and when a difference between the output of the sensor 81 and the threshold value is less than a voltage threshold value for determining to be a gap portion, or the number of dot lines for which the output of the sensor 81 exceeds the threshold value is less than a number-of-dot-lines threshold value for determining to be a gap portion. With this configuration, it can be determined that the fluttering of the label portion P1 has been detected based on the voltage threshold value for determining to be a gap portion, and the number-of-dot-lines threshold value for determining to be a gap portion.

Yet further, the determiner 5-9 determines that the portion between adjacent label portions P1 has been detected when the threshold value calculated by the moving average calculator 5-8 is less than the output of the sensor 81, when the output of the sensor 81 is higher than the threshold value by a voltage threshold value for determining to be a gap portion G or more, and the number of dot lines for which the output of the sensor 81 exceeds the threshold value is a number-of-dot-lines threshold value for determining to be a gap portion G or more, and when the output of the sensor 81 is the maximum value of the moving averages of the previous gap portions G or less when paper is fed by a number-of-dot-lines threshold value for determining to be out of paper. With this configuration, it can be determined that the portion between the adjacent label portions P1 has been detected based on the number-of-dot-lines threshold value for determining to be out of paper when the output of the sensor 81 is higher than the threshold value by the voltage threshold value for determining to be the gap portion G or more, and the number of dot lines for which the output of the sensor 81 exceeds the threshold value is the number-of-dot-lines threshold value for determining to be a gap portion G or more.

Yet further, the determiner 5-9 determines that running out of paper has been detected when the threshold value calculated by the moving average calculator 5-8 is less than the output of the sensor 81, when the output of the sensor 81 is higher than the threshold value by the voltage threshold value for determining to be a gap portion G or more, and the number of dot lines for which the output of the sensor 81 exceeds the threshold value is the number-of-dot-lines threshold value for determining to be a gap portion G or more, and when the output of the sensor 81 is higher than the maximum value of the moving averages of the previous gap portions G after the paper is fed by the number-of-dot-lines threshold value for determining to be out of paper. With this configuration, it can be determined that running out of paper has been detected based on the number-of-dot-lines threshold value for determining to be out of paper when the output of the sensor 81 is higher than the threshold value by the voltage threshold value for determining to be a gap portion G or more, and the number of dot lines for which the output of the sensor 81 exceeds the threshold value is the number-of-dot-lines threshold value for determining to be a gap portion G or more.

Yet further, the determiner 5-9 updates the moving average corresponding to the portion between the label portions P1 based on the output of the sensor 81 when the output of the sensor 81 is higher than the threshold value calculated by the moving average calculator 5-8, or when the output of the sensor 81 is higher than the moving average corresponding to the portion between the label portions P1. With this configuration, the moving average corresponding to the portion between the label portions P1 can be updated based on the threshold value or the moving average corresponding to the portion between the label portions P1.

All or a part of the function of each device included in the host terminal 2 and the printer apparatus 8 in the above-mentioned at least one embodiment may also be implemented by recording a program for implementing those functions in a computer-readable recording medium, and reading and executing the program recorded in the recording medium on a computer system. As used herein, the "computer system" may include an OS and hardware, for example, a peripheral device.

Further, the term "computer-readable recording medium" refers to portable media, such as a flexible disk, a magneto-optical disc, a ROM, and a CD-ROM, or a storage included in the computer system, for example, a hard disk drive. The term "computer-readable recording medium" may also refer to a medium which dynamically holds a program for a short period of time, like a communication cable used when a program is transmitted via a network, for example, the Internet, or a communication line, for example, a telephone line, or to a medium which holds a program for a fixed period of time, like a volatile memory in a computer system serving as a server or a client in such a case. The above-mentioned program may be a program for implementing a part of the above-mentioned functions, or may be capable of implementing the above-mentioned functions in combination with a program already recorded in the computer system.

This concludes the descriptions of the at least one embodiment as at least one mode for carrying out the present invention. However, the present invention is not limited to the above-mentioned at least one embodiment in any way, and various modifications and substitutions can be made within the scope that does not depart from the spirit of the present invention.

What is claimed is:

1. A printing system, comprising:
   at least one processor configured to:
   control a conveyor, the conveyor being configured to convey paper having a printing surface in which label portions are formed at predetermined intervals;
   a sensor configured to irradiate light on the paper conveyed by the conveyor to detect reflected light of the irradiated light;
   wherein the at least one processor is further configured to:

detect an output of the sensor;
calculate moving averages of voltage values based on the output of the sensor;
determine that a portion between an adjacent pair of the label portions has been detected based on the moving averages of the voltage values, and the output of the sensor;
acquire a moving average corresponding to the portion between the adjacent pair of the label portions based on the moving averages of the voltage values, and calculate a threshold value for determining to be a portion between the adjacent pair of the label portions based on the acquired moving average corresponding to the portion between the adjacent pair of the label portions and the moving averages of the voltage values; and
determine that the portion between the adjacent pair of the label portions has been detected when the threshold value is the output of the sensor or more.

2. The printing system according to claim 1, wherein the at least one processor is configured to calculate a moving average for dot lines set based on a length of the portion between the adjacent pair of the label portions.

3. The printing system according to claim 1, wherein the at least one processor is configured to determine that fluttering of a label portion has been detected when the threshold value is less than the output of the sensor, and when a difference between the output of the sensor and the threshold value is less than a voltage threshold value for determining to be a gap portion, or the number of dot lines for which the output of the sensor exceeds the threshold value is less than a number-of-dot-lines threshold value for determining to be a gap portion.

4. The printing system according to claim 3, wherein the at least one processor is configured to determine that the portion between the adjacent pair of the label portions has been detected when the threshold value is less than the output of the sensor, when the output of the sensor is higher than the threshold value by the voltage threshold value for determining to be a gap portion or more, and the number of dot lines for which the output of the sensor exceeds the threshold value is the number-of-dot-lines threshold value for determining to be a gap portion or more, and when the output of the sensor is a maximum value of moving averages of previous gap portions or less after the paper is fed by a number-of-dot-lines threshold value for determining to be out of paper.

5. The printing system according to claim 4, wherein the at least one processor is configured to determine that running out of paper has been detected when the threshold value is less than the output of the sensor, when the output of the sensor is higher than the threshold value by the voltage threshold value for determining to be a gap portion or more, and the number of dot lines for which the output of the sensor exceeds the threshold value is the number-of-dot-lines threshold value for determining to be a gap portion or more, and when the output of the sensor is higher than the maximum value of the moving averages of the previous gap portions after the paper is fed by the number-of-dot-lines threshold value for determining to be out of paper.

6. The printing system according to claim 1, wherein the at least one processor is configured to update the moving average corresponding to the portion between the adjacent pair of the label portions based on the output of the sensor when the output of the sensor is higher than the threshold value, or the output of the sensor is higher than the moving average corresponding to the portion between the adjacent pair of the label portions.

7. A detection method to be executed by a printing system, the detection method comprising:
controlling a conveyor configured to convey paper having a printing surface in which label portions are formed at predetermined intervals;
irradiating, by a sensor, light on the paper conveyed by the conveyor to detect reflected light of the irradiated light;
detecting an output of the sensor;
calculating moving averages of voltage values based on the output of the sensor detected in the detecting;
determining that a portion between an adjacent pair of the label portions has been detected based on the moving averages of the voltage values calculated in the calculating of the moving averages of the voltage values;
acquiring a moving average corresponding to the portion between the adjacent pair of the label portions based on the moving averages of the voltage values, and calculate a threshold value for determining to be a portion between the adjacent pair of the label portions based on the acquired moving average corresponding to the portion between the adjacent pair of the label portions and the moving averages of the voltage values; and
determining that the portion between the adjacent pair of the label portions has been detected in response to the threshold value being the output of the sensor or more.

8. A non-transitory recording medium having stored therein a computer program for causing a computer of a printing system to execute:
controlling a conveyor configured to convey paper having a printing surface in which label portions are formed at predetermined intervals;
irradiating, by a sensor, light on the paper conveyed by the conveyor to detect reflected light of the irradiated light;
detecting an output of the sensor;
calculating moving averages of voltage values based on the output of the sensor detected in the detecting;
determining that a portion between an adjacent pair of the label portions has been detected based on the moving averages of the voltage values calculated in the calculating of the moving averages of the voltage values;
acquiring a moving average corresponding to the portion between the adjacent pair of the label portions based on the moving averages of the voltage values, and calculate a threshold value for determining to be a portion between the adjacent pair of the label portions based on the acquired moving average corresponding to the portion between the adjacent pair of the label portions and the moving averages of the voltage values; and
determining that the portion between the adjacent pair of the label portions has been detected in response to the threshold value being the output of the sensor or more.

* * * * *